(12) United States Patent
Brown et al.

(10) Patent No.: US 11,248,129 B2
(45) Date of Patent: Feb. 15, 2022

(54) LIQUID IMPREGNATED SURFACES FOR LIQUID REPELLANCY

(71) Applicant: Ohio State Innovation Foundation, Columbus, OH (US)

(72) Inventors: Philip Simon Brown, Columbus, OH (US); Bharat Bhushan, Powell, OH (US)

(73) Assignee: Ohio State Innovation Foundation, Columbus, OH (US)

( * ) Notice: Subject to any disclaimer, the term of this patent is extended or adjusted under 35 U.S.C. 154(b) by 243 days.

(21) Appl. No.: 15/798,032

(22) Filed: Oct. 30, 2017

(65) Prior Publication Data

US 2018/0118957 A1 May 3, 2018

Related U.S. Application Data

(60) Provisional application No. 62/531,114, filed on Jul. 11, 2017, provisional application No. 62/414,552, filed on Oct. 28, 2016.

(51) Int. Cl.
 *C09D 5/16* (2006.01)
 *C08J 9/28* (2006.01)
 (Continued)

(52) U.S. Cl.
 CPC ........... *C09D 5/1693* (2013.01); *B05D 3/007* (2013.01); *B05D 5/083* (2013.01); *B05D 7/02* (2013.01);
 (Continued)

(58) Field of Classification Search
 CPC .. C09D 5/1681; C09D 5/1693; C09D 171/02; C09D 123/12; B08B 17/065; C08J 9/28;
 (Continued)

(56) References Cited

U.S. PATENT DOCUMENTS

| 8,535,779 B1 | 9/2013 | Smith et al. |
| 2003/0031833 A1* | 2/2003 | Sugimura ............. B29C 41/045 428/156 |

(Continued)

OTHER PUBLICATIONS

Zhao et al. (Fabrication of Biomimetic Superhydrophobic Coating with Micro-Nano-Binary Structure, Macromol.Rapid Commun. 2005, 26, pp. 1075-1080) (Year: 2005).*

(Continued)

*Primary Examiner* — Francisco W Tschen
(74) *Attorney, Agent, or Firm* — Meunier Carlin & Curfman LLC

(57) ABSTRACT

Articles including repellent surfaces and methods of making and using these articles are disclosed. The repellant surface can comprise a polymer having a roughened surface and a fluorinated silane and a lubricating liquid deposited on the roughened surface. The repellent surface, and by extension the articles described herein, can exhibit superomniphobic properties. The methods for producing the repellant surface can comprise dissolving a polymer in a solvent to produce a polymer solution and optionally adding a non-solvent to the polymer solution to produce a casting mixture. The polymer solution or casting mixture can be deposited on a surface of a substrate and the solvent and/or the non-solvent evaporated to provide a coated-substrate having a roughened surface. A functional layer comprising a fluorinated silane followed by a lubricating liquid can be deposited on the roughened surface to form the repellant surface.

21 Claims, 8 Drawing Sheets

(51) Int. Cl.
  B05D 3/00       (2006.01)
  B05D 5/08       (2006.01)
  C09D 171/02     (2006.01)
  C09D 123/12     (2006.01)
  C08J 9/42       (2006.01)
  B05D 7/02       (2006.01)

(52) U.S. Cl.
  CPC . *C08J 9/28* (2013.01); *C08J 9/42* (2013.01);
       *C09D 5/1681* (2013.01); *C09D 123/12*
       (2013.01); *C09D 171/02* (2013.01); *C08J*
       *2323/12* (2013.01); *C08J 2325/06* (2013.01);
       *C08J 2423/12* (2013.01); *C08J 2471/02*
       (2013.01)

(58) Field of Classification Search
  CPC ...... C08J 9/42; C08J 2423/12; C08J 2471/02;
       C08J 2325/06; C08J 2323/12
  See application file for complete search history.

(56) References Cited

U.S. PATENT DOCUMENTS

| | | | | |
|---|---|---|---|---|
| 2003/0207130 | A1* | 11/2003 | Pellerite | C04B 33/00 428/447 |
| 2012/0171392 | A1* | 7/2012 | Cho | B29D 11/0074 428/1.31 |
| 2014/0314975 | A1* | 10/2014 | Smith | B05C 7/00 428/34.1 |

OTHER PUBLICATIONS

Manna et al. Slippery Liquid-Infused Porous Surfaces that Prevent Bacterial Surface Fouling and Inhibit Virulence Phenotypes in Surrounding Planktonic Cells, ACS Infect Dis. Jul. 8, 2016; 2(7): 509-517 (Year: 2016).*

Manna et al., Synthetic Surfaces with Robust and Tunable Underwater Superoleophobicity, Adv. Funct. Mater. 2015, 25, 1672-1681 (Year: 2015).*

Wang et al. Slippery liquid-infused porous surfaces fabricated on aluminum as a barrier to corrosion induced by sulfate reducing bacteria, Corrosion Science, vol. 93, Apr. 2015, pp. 159-166. (Year: 2015).*

Al-Sabagh, A. M., et al. "Surface active and thermodynamic properties of some surfactants derived from locally linear and heavy alkyl benzene in relation to corrosion inhibition efficiency." Materials and Corrosion 62.11 (2011): 1015-1030.

Anonymous (2014), "Typical Engineering Properties of Polypropylene," http://www.ineos.com/globalassets/ineos-group/businesses/ineos-olefins-and-polymersusa/products/technical-information--patents/ineos-engineering-properties-of-pp.pdf accessed May 12, 2016.

Artursson, P., and J. Karlsson. "Correlation between oral drug absorption in humans and apparent drug permeability coefficients in human intestinal epithelial (Caco-2) cells." Biochemical and biophysical research communications 175.3 (1991): 880-885.

Barthlott, Wilhelm, and Christoph Neinhuis. "Purity of the sacred lotus, or escape from contamination in biological surfaces." Planta 202.1 (1997): 1-8.

Becke, Axel D. "Density-functional exchange-energy approximation with correct asymptotic behavior." Physical review A 38.6 (1988): 3098.

Becke, Axel D. "Density-functional thermochemistry. I. The effect of the exchange-only gradient correction." The Journal of Chemical Physics 96.3 (1992a): 2155-2160.

Becke, Axel D. "Density-functional thermochemistry. II. The effect of the Perdew-Wang generalized-gradient correlation correction." The Journal of chemical physics 97.12 (1992b): 9173-9177.

Becke, Axel D. "Density-functional thermochemistry. III. The role of exact exchange." The Journal of chemical physics 98.7 (1993): 5648-5652.

Bhurke, Alekh S., Per A. Askeland, and Lawrence T. Drzal. "Surface modification of polycarbonate by ultraviolet radiation and ozone." The Journal of Adhesion 83.1 (2007): 43-66.

Bhushan, Bharat, Yong Chae Jung, and Kerstin Koch. "Micro-, nano-and hierarchical structures for superhydrophobicity, self-cleaning and low adhesion." Philosophical Transactions of the Royal Society of London A: Mathematical, Physical and Engineering Sciences 367.1894 (2009): 1631-1672.

Bixler, Gregory D., et al. "Anti-fouling properties of microstructured surfaces bio-inspired by rice leaves and butterfly wings." Journal of colloid and interface science 419 (2014): 114-133.

Bohn, Holger F., and Walter Federle. "Insect aquaplaning: Nepenthes pitcher plants capture prey with the peristome, a fully wettable water-lubricated anisotropic surface." Proceedings of the National Academy of Sciences of the United States of America 101.39 (2004): 14138-14143.

Brown, Philip S., and Bharat Bhushan. "Mechanically durable, superoleophobic coatings prepared by layer-by-layer technique for anti-smudge and oil-water separation." Scientific reports 5 (2015a): 8701. p. 1-9.

Brown, Philip S., and Bharat Bhushan. "Mechanically durable, superomniphobic coatings prepared by layer-by-layer technique for self-cleaning and anti-smudge." Journal of colloid and interface science 456 (2015b): 210-218.

Brown, Philip S., and Bharat Bhushan. "Bioinspired, roughness-induced, water and oil super-philic and super-phobic coatings prepared by adaptable layer-by-layer technique." Scientific reports 5 (2015c): 14030.

Brown, Philip S., and Bharat Bhushan. "Designing bioinspired superoleophobic surfaces." APL Materials 4.1 (2016a): 015703.

Brown, Philip S., and Bharat Bhushan. "Durable, superoleophobic polymer-nanoparticle composite surfaces with re-entrant geometry via solvent-induced phase transformation." Scientific reports 6 (2016b): 21048.

Brown, Philip S., and Bharat Bhushan. "Durable superoleophobic polypropylene surfaces." Phil. Trans. R. Soc. A 374.2073 (2016c): 20160193.

Brown, Philip S., and Bharat Bhushan. "Liquid-impregnated porous polypropylene surfaces for liquid repellency." Journal of colloid and interface science 487 (2017): 437-443.

Cassie, A. B. D., and S. Baxter. "Wettability of porous surfaces." Transactions of the Faraday society 40 (1944): 546-551.

Chi, K. W.; Ahn, Y. S.; Shim, K. T.; Park, T. H.; Ahn, J. S. Bull. One-pot synthesis of Mannich base using hydroxy aromatic rings and secondary amines. Korean Chem. Soc. 1999, 20, 973.

Contreras, Cintia B., et al. "Permanent superhydrophobic polypropylene nanocomposite coatings by a simple one-step dipping process." Applied Surface Science 307 (2014): 234-240.

Cui, Yuehua, et al. "Hierarchical polymeric textures via solvent-induced phase transformation: a single-step production of large-area superhydrophobic surfaces." Colloids and Surfaces A: Physicochemical and Engineering Aspects 394 (2012): 8-13.

Dankovich, Theresa A., and Derek G. Gray. "Bactericidal paper impregnated with silver nanoparticles for point-of-use water treatment." Environmental science & technology 45.5 (2011): 1992-1998.

Dhar, Joydeep, and Satish Patil. "Self-assembly and catalytic activity of metal nanoparticles immobilized in polymer membrane prepared via layer-by-layer approach." ACS applied materials & interfaces 4.3 (2012): 1803-1812.

Du, Xin, Xiaoyu Li, and Junhui He. "Facile fabrication of hierarchically structured silica coatings from hierarchically mesoporous silica nanoparticles and their excellent superhydrophilicity and superhydrophobicity." ACS applied materials & interfaces 2.8 (2010): 2365-2372.

Ebert, Daniel, and Bharat Bhushan. "Transparent, superhydrophobic, and wear-resistant coatings on glass and polymer substrates using SiO2, ZnO, and ITO nanoparticles." Langmuir 28.31 (2012): 11391-11399.

(56) References Cited

OTHER PUBLICATIONS

Efimenko, Kirill, William E. Wallace, and Jan Genzer. "Surface modification of Sylgard-184 poly (dimethyl siloxane) networks by ultraviolet and ultraviolet/ozone treatment." Journal of colloid and interface science 254.2 (2002): 306-315.
Erbil, H. Yildirim, et al. "Transformation of a simple plastic into a superhydrophobic surface." Science 299.5611 (2003): 1377-1380.
Ester, M., Kriegel, H. P., Sander, J., Xu, X. (1996) "A density-based algorithm for discovering clusters in large spatial databases with noise." In Proceedings of the Second International Conference on Knowledge Discovery and Data Mining (KDD-96); Simoudis, E., Han, J., Fayyad, U., Eds.; AAAI Press: Palo Alto, CA; 226-231.
Ferrari, E., Fabbri, P. & Pilati, F. Solvent and Substrate Contributions to the Formation of Breath Figure Patterns in Polystyrene Films. Langmuir 27, 1874-1881 (2011).
Fogolari, F., Brigo, A., Molinaro, H. (2003) "Protocol for MM/PBSA molecular dynamics simulations of proteins" Biophys. J., 85, 159-166.
Franco, J. A., Kentish, S. E., Perera, J. M., and Stevens G. W. (2008) "Fabrication of a superhydrophobic polypropylene membrane by deposition of a porous crystalline polypropylene coating," J. Membr. Sci. 318, 107-113.
Gaume, L., Perret, P., Gorb, E., Gorb, S., Labat, J.-J., and Rowe, N. (2004) "How do plant waxes cause flies to slide? Experimental tests of wax-based trapping mechanisms in three pitfail carnivorous plants," Arthropod Struct. Dev. 33, 103-111.
Ghosh, N., Bajoria, A. and Vaidya, A. A. (2009), "Surface chemical modification of poly (dimethylsiloxane)-based biomimetic materials: oil-repellent surfaces," ACS Appl. Mater. Interfaces 1, 2636-2644.
Gogolides, E., Ellinas, K. and Tserepi, A. (2015) "Hierarchical micro and nano structured, hydrophilic, superhydrophobic and superoleophobic surfaces incorporated in microfluidics, microarrays and lab on chip microsystems," Microelectron. Eng. 132, 135-155.
Hattori, H. (2001), "Anti-reflection surface with particle coating deposited by electrostatic attraction," Adv. Mater. 13, 51-54.
He, Z., Ma, M., Lan, X., Chen, F., Wang, K., Deng, H., . . . & Fu, Q. (2011). Fabrication of a transparent superamphiphobic coating with improved stability. Soft Matter, 7(14), 6435-6443.
Hensel, R., Helbig, R., Aland, S., Braun, H. G., Voigt, A., Neinhuis, C., & Werner, C. (2013). Wetting resistance at its topographical limit: the benefit of mushroom and serif T structures. Langmuir, 29(4), 1100-1112.
Hsieh, C. T., Chen, J. M., Kuo, R. R., Lin, T. S., & Wu, C. F. (2005). Influence of surface roughness on water-and oil-repellent surfaces coated with nanoparticles. Applied Surface Science, 240(1-4), 318-326.
Hsieh, C. T., Wu, F. L., & Chen, W. Y. (2009). Super water-and oil-repellencies from silica-based nanocoatings. Surface and Coatings Technology, 203(22), 3377-3384.
Im, M., Im, H., Lee, J. H., Yoon, J. B., & Choi, Y. K. (2010). A robust superhydrophobic and superoleophobic surface with inverse-trapezoidal microstructures on a large transparent flexible substrate. Soft Matter, 6(7), 1401-1404.
Kang, S. M., Kim, S. M., Kim, H. N., Kwak, M. K., Tahk, D. H., & Suh, K. Y. (2012). Robust superomniphobic surfaces with mushroom-like micropillar arrays. Soft Matter, 8(33), 8563-8568.
Kim, P. et al. Liquid-Infused Nanostructured Surfaces with Extreme Anti-Ice and Anti-Frost Performance. ACS Nano 6, 6569-6577 (2012).
Lee, C., Yang, W. and Parr, R. G. (1988) "Development of the Colle-Salvetti correlation-energy formula into a functional of the electron density" Phys. Rev. B 37, 785-789.
Lee, K. K., & Ahn, C. H. (2013). Superhydrophilic multilayer silica nanoparticle networks on a polymer microchannel using a spray layer-by-layer nanoassembly method. ACS applied materials & interfaces, 5(17), 8523-8530.

Liu, X., & He, J. (2008). Superhydrophilic and antireflective properties of silica nanoparticle coatings fabricated via layer-by-layer assembly and postcalcination. The Journal of Physical Chemistry C, 113(1), 148-152.
Lovingood, D. D., Salter, W. B., Griffith, K. R., Simpson, K. M., Hearn, J. D., & Owens, J. R. (2013). Fabrication of liquid and vapor protective cotton fabrics. Langmuir, 29(48), 15043-15050.
Ma, W., Higaki, Y., Otsuka, H., & Takahara, A. (2013). Perfluoropolyether-infused nano-texture: a versatile approach to omniphobic coatings with low hysteresis and high transparency. Chemical Communications, 49(6), 597-599.
Macmanus, L. F., Walzak, M. J., & McIntyre, N. S. (1999). Study of ultraviolet light and ozone surface modification of polypropylene. Journal of Polymer Science-A-Polymer Chemistry Edition, 37(14), 2489-2502.
Marsais, F., Trécourt, F., Bréant, P., & Quéguiner, G. (1988). Directed lithiation of 4-halopyridines: Chemoselectivity, regioselectivity and application to synthesis. Journal of heterocyclic chemistry, 25(1), 81-87.
Martin, S., & Bhushan, B. (2017). Transparent, wear-resistant, superhydrophobic and superoleophobic poly (dimethylsiloxane)(PDMS) surfaces. Journal of colloid and interface science, 488, 118-126.
Mullen, P. A., & Searle, N. Z. (1970). The ultraviolet activation spectrum of polycarbonate. Journal of applied polymer science, 14(3), 765-776.
Muthiah, P., Bhushan, B., Yun, K., & Kondo, H. (2013). Dual-layered-coated mechanically-durable superomniphobic surfaces with anti-smudge properties. Journal of colloid and interface science, 409, 227-236.
Nishino, T., Meguro, M., Nakamae, K., Matsushita, M., & Ueda, Y. (1999). The lowest surface free energy based on—CF3 alignment. Langmuir, 15(13), 4321-4323.
Oláh, A., Hillborg, H., & Vancso, G. J. (2005). Hydrophobic recovery of UV/ozone treated poly (dimethylsiloxane): adhesion studies by contact mechanics and mechanism of surface modification. Applied Surface Science, 239(3-4), 410-423.
Park, E. J., Carroll, G. T., Turro, N. J., & Koberstein, J. T. (2009). Shedding light on surfaces—using photons to transform and pattern material surfaces. Soft Matter, 5(1), 36-50.
Park, H. B., Han, D. W., & Lee, Y. M. (2003). Effect of a UV/ozone treatment on siloxane-containing copolyimides: surface modification and gas transport characteristics. Chemistry of materials, 15(12), 2346-2353.
Peng, J., Han, Y., Yang, Y., & Li, B. (2004). The influencing factors on the macroporous formation in polymer films by water droplet templating. Polymer, 45(2), 447-452.
Pham, K. N., Fullston, D., & Sagoe-Crentsil, K. (2007). Surface charge modification of nano-sized silica colloid. Australian Journal of Chemistry, 60(9), 662-666.
Polystyrene, http://www.goodfellow.com/E/Polystyrene.html, accessed Mar. 21, 2019, 3 pages.
Qian, B., & Shen, Z. (2005). Fabrication of superhydrophobic surfaces by dislocation-selective chemical etching on aluminum, copper, and zinc substrates. Langmuir, 21(20), 9007-9009.
Qu, M., Zhang, B., Song, S., Chen, L., Zhang, J., & Cao, X. (2007). Fabrication of Superhydrophobic Surfaces on Engineering Materials by a Solution-Immersion Process. Advanced Functional Materials, 17(4), 593-596.
Rakitov, R., & Gorb, S. N. (2013). Brochosomal coats turn leafhopper (Insecta, Hemiptera, Cicadellidae) integument to superhydrophobic state. Proceedings of the Royal Society of London B: Biological Sciences, 280(1752), 20122391.
Rayleigh, L. Breath Figures. Nature 86, 416-417 (1911).
Roe, D., Karandikar, B., Bonn-Savage, N., Gibbins, B., & Roullet, J. B. (2008). Antimicrobial surface functionalization of plastic catheters by silver nanoparticles. Journal of antimicrobial chemotherapy, 61(4), 869-876.
Roe, D. R., Bergonzo, C., & Cheatham III, T. E. (2014). Evaluation of enhanced sampling provided by accelerated molecular dynamics with Hamiltonian replica exchange methods. The Journal of Physical Chemistry B, 118(13), 3543-3552.

(56) References Cited

OTHER PUBLICATIONS

Rosidian, A., Liu, Y., & Claus, R. O. (1998). Ionic Self-Assembly of Ultrahard ZrO2/Polymer Nanocomposite Thin Films. Advanced Materials, 10(14), 1087-1091.

Ross, J., & Epstein, M. B. (1958). Surface tension and surface transition of dilute aqueous solutions of lauryl alcohol in sodium lauryl sulfate. The Journal of Physical Chemistry, 62(5), 533-535.

Saito, T., Tsushima, Y., & Sawada, H. (2015). Facile creation of superoleophobic and superhydrophilic surface by using fluoroalkyl end-capped vinyltrimethoxysilane oligomer/calcium silicide nanocomposites—development of these nanocomposites to environmental cyclical type-fluorine recycle through formation of calcium fluoride. Colloid and Polymer Science, 293(1), 65-73.

Sawada, H., Ikematsu, Y., Kawase, T., & Hayakawa, Y. (1996). Synthesis and surface properties of novel fluoroalkylated flip-flop-type silane coupling agents. Langmuir, 12(15), 3529-3530.

Sawada, H., Yoshioka, H., Kawase, T., Takahashi, H., Abe, A., & Ohashi, R. (2005). Synthesis and applications of a variety of fluoroalkyl end-capped oligomers/silica gel polymer hybrids. Journal of applied polymer science, 98(1), 169-177.

Sellergren, B., Swietlow, A., Arnebrant, T., & Unger, K. (1996). Consecutive selective adsorption of pentamidine and phosphate biomolecules on a selfassembled layer: reversible formation of a chemically selective coating. Analytical Chemistry, 68(2), 402-407.

Sheen, Y. C., Huang, Y. C., Liao, C. S., Chou, H. Y., & Chang, F. C. (2008). New approach to fabricate an extremely superamphiphobic surface based on fluorinated silica nanoparticles. Journal of Polymer Science Part B: Polymer Physics, 46(18), 1984-1990.

Singh, U. C., & Kollman, P. A. (1984). An approach to computing electrostatic charges for molecules. Journal of Computational Chemistry, 5(2), 129-145.

Soontravanich, S., Munoz, J. A., Scamehom, J. F., Harwell, J. H., & Sabatini, D. A. (2008). Interaction between an anionic and an amphoteric surfactant. Part I: Monomer-micelle equilibrium. Journal of surfactants and detergents, 11(4), 251-261.

Srinivasarao, M., Collings, D., Philips, A., & Patel, S. (2001). Three-dimensionally ordered array of air bubbles in a polymer film. Science, 292(5514), 79-83.

Steele, A., Bayer, I., & Loth, E. (2008). Inherently superoleophobic nanocomposite coatings by spray atomization. Nano letters, 9(1), 501-505.

Stenzel, M. H., Barner-Kowollik, C., & Davis, T. P. (2006). Formation of honeycomb-structured, porous films via breath figures with different polymer architectures. Journal of Polymer Science Part A: Polymer Chemistry, 44(8), 2363-2375.

Stevens, P. J., Devlin, F. J., Chablowski, C. F. and Frisch, M. J. (1994) "Ab initio calculation of vibrational absorption and circular dichroism spectra using density functional force fields" J. Phys. Chem. 98, 11623-11627.

Ton-That, C., Teare, D. O. H., Campbell, P. A., & Bradley, R. H. (1999). Surface characterisation of ultraviolet-ozone treated PET using atomic force microscopy and X-ray photoelectron spectroscopy. Surface science, 433, 278-282.

Tuteja, A., Choi, W., Mabry, J. M., McKinley, G. H., & Cohen, R. E. (2008). Robust omniphobic surfaces. Proceedings of the National Academy of Sciences, 105(47), 18200-18205.

Vig, J. R. (1985), "UV/ozone cleaning of surfaces," J. Vac. Sci. Technol. A 3, 1027-1034.

Vogel, N., Belisle, R. A., Hatton, B., Wong, T. S., & Aizenberg, J. (2013). Transparency and damage tolerance of patternable omniphobic lubricated surfaces based on inverse colloidal monolayers. Nature communications, 4, 2176.

Walzak, M. J., Flynn, S., Foerch, R., Hill, J. M., Karbashewski, E., Lin, A. and Strobel, M. (1995), "UV and ozone treatment of polypropylene and poly (ethylene terephthalate)," J. Adhes. Sci. Technol. 9, 1229-1248.

Wang, Y., & Bhushan, B. (2014). Wear-resistant and antismudge superoleophobic coating on polyethylene terephthalate substrate using SiO2 nanoparticles. ACS applied materials & interfaces, 7(1), 743-755.

Wenzel, R. N. Resistance of Solid Surfaces to Wetting by Water. Ind. Eng. Chem. 28, 988-994 (1936).

Wong, T. S., Kang, S. H., Tang, S. K., Smythe, E. J., Hatton, B. D., Grinthal, A., & Aizenberg, J. (2011). Bioinspired self-repairing slippery surfaces with pressure-stable omniphobicity. Nature, 477(7365), 443.

* cited by examiner

LIQUID IMPREGNATED SURFACES FOR LIQUID REPELLANCY

CROSS-REFERENCE TO RELATED APPLICATIONS

This application claims priority to U.S. Provisional Application Ser. No. 62/414,552, filed on Oct. 28, 2016, and U.S. Provisional Application Ser. No. 62/531,114, filed on Jul. 11, 2017, the disclosures of which are incorporated herein by reference in their entireties.

FIELD

This disclosure relates generally to articles comprising a repellant surface and methods of making the repellant surface.

BACKGROUND

A range of desirable surface properties such as anti-fouling, self-cleaning, and anti-smudge repellency all rely on altering both the chemistry and roughness of a surface to achieve liquid repellency. Extreme water repellency, also known as super hydrophobicity, is where the contact angle of water on a surface is greater than 150° and the contact angle hysteresis (difference between advancing and receding contact angles) is less than 2°. This allows the liquid droplet to roll off the surface with no contamination. This repellency is typically achieved by roughening a hydrophobic surface, increasing the solid surface area in contact with the droplet. Alternatively, air can become trapped between the surface and the liquid.

Liquid repellency becomes more difficult when the surface tension of the liquid to be repelled is low. This is true for oils, since oil droplets typically exhibit contact angles of <90° on flat surfaces (oleophilic). However, high repellency via the Cassie-Baxter state of wetting can still be achieved through the use of re-entrant surface features, where the asperities create an overhang (i.e. become narrower closer to the surface). Such a configuration whereby air is trapped between the droplet and surface is only metastable state and, via applied pressure or surface vibration, the liquid will eventually penetrate into the roughness and fully wet the surface.

An alternate method of creating liquid-repellent surfaces is to take inspiration from the Nepenthes pitcher plants, which features a microstructured surface that is wet by netar and rainwater to result in a continuous liquid film. When wet, this region becomes extremely slippery and insects aquaplane across the surface and fall into the pitcher. There are several examples of pitcher plant-inspired, liquid-impregnated surfaces. These previous examples have several drawbacks that potentially limit their applicability to a range of scenarios. Teflon nanofibres and epoxy-molded nanoposts have previously been utilized as the required porous solid surface. However, such examples are unsuitable for certain real world applications due to their composition, fragility, and cost of fabrication.

There remains a need in the art for coatings having improved properties, including desirable surface properties combined with durability, as well as improved methods of making such coatings.

SUMMARY

Provided herein are articles including repellent surfaces, as well as methods of making and using these articles. The articles can comprise a substrate and a repellent surface disposed on a surface of the substrate. The repellant surface can comprise a polymer having a roughened surface. The roughened surface can comprise a fluorinated silane and a lubricating liquid. The repellent surface, and by extension the articles described herein, can exhibit superomniphobic properties.

The methods for producing the repellant surface can comprise dissolving a polymer in a solvent to produce a polymer solution. The polymer in the polymer solution can be selected from a hydrophobic polymer. Exemplary hydrophobic polymers include, but are not limited to, a polyalkylene, a vinyl aromatic polymer, an acrylonitrile butadiene styrene copolymer, a polybutadiene polymer, a copolymer thereof, or a blend thereof. The solvent in the polymer solution can comprise a water immiscible organic solvent, for example, xylene. The polymer and the solvent can be present at a weight ratio of from 1:100 to 50:1 for example, from 1:50 to 50:1 or from 1:25 to 25:1.

In certain embodiments, the method can include adding a non-solvent to the polymer solution to produce a casting mixture. The non-solvent can comprise a polar organic solvent, for example, cyclohexanone. The solvent and the non-solvent can be present in the casting mixture in a volume ratio of from 100:1 to 1:2, for example, from 10:1 to 1:2 or from 5:1 to 1:1.

The polymer solution or casting mixture can be deposited on a surface of a substrate. The solvent and/or the non-solvent can then be evaporated from the polymer solution or casting mixture to provide a coated-substrate having a roughened surface. In certain embodiments, evaporation can be carried out at a suitable temperature such as less than 100° C., from 20° C. to less than 100° C., at ambient temperature, or from 20° C. to 25° C., and under an atmosphere comprising water vapor (e.g., an atmosphere having a relative humidity of at least about 50%, such as an atmosphere that has a relative humidity of from about 50% to about 60%). In alternate embodiments, evaporation can be carried out at an elevated temperature. For example, the solvent and the non-solvent can be evaporated from the casting mixture at a temperature of 250° C. or less, for example, from 60° C. to 250° C.

The roughened surface, formed after evaporation of the solvent and/or non-solvent, can comprise a porous or patterned surface. For example, the roughened surface can comprise randomly, regularly, or quasi-regularly arranged three-dimensionally interconnected network of pores or randomly or regularly arranged two-dimensionally network of patterns. The two-dimensionally network of patterns can include blind and/or interconnected patterns. Such patterns can include a honeycomb pattern. The size of the pores or pattern on the roughened surface can be from about 1 nm to about 100 microns. For example, the pores on the roughened surface can be from about 1 nm to about 100 microns and the patters from about 100 nm to about 100 microns. The water contact angle of the roughened surface can be at least about 120°. The roughened surface may exhibit a mechanical wear of at least about 200 cycles, as determined by a tribometer wear test having an applied weight of 10 mN and a contact pressure of from 10 to 15 MPa.

In certain embodiments, a functional layer comprising a fluorinated silane can be deposited on the roughened surface. In some embodiments, the functional material can be covalently attached to the polymer which forms the roughened surface. The roughened surface can exhibit a water contact angle of at least about 130° and a hexadecane contact angle of at least about 95° following deposition of the functional layer.

The method for producing a repellant surface can further comprise introducing a lubricating liquid on the roughened surface to form a liquid impregnated layer. The lubricating liquid can be selected from a fluorinated hydrocarbon. The roughened surface can exhibit a water contact angle of at least about 105°, a hexadecane contact angle of at least about 65°, and a tilt angle of about 5° or less following deposition of the lubricating liquid.

The articles described herein can exhibit tunable liquid repellency, making them useful in a wide range of applications including in oil-water separation. In some embodiments, methods of using the repellent surfaces can comprise contacting the article with a liquid mixture.

BRIEF DESCRIPTION OF THE FIGURES

The accompanying figures, which are incorporated in and constitute a part of this specification, illustrate several aspects described below.

DETAILED DESCRIPTION

Figure 1:
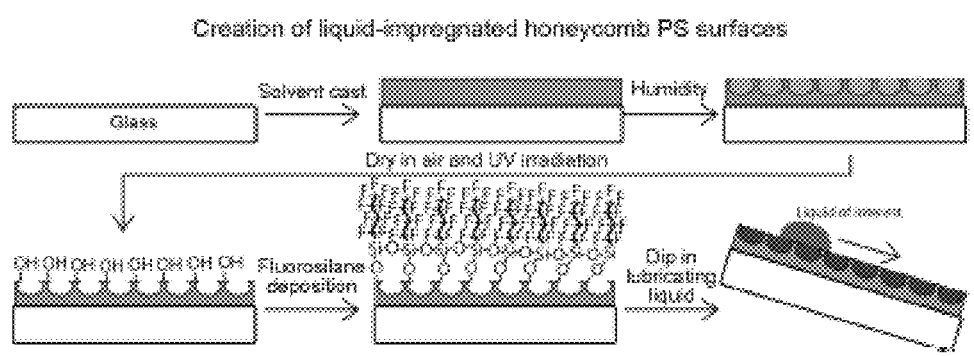
FIG. 1 is a schematic to show the creation of liquid-impregnated honeycomb surfaces. Polymer dissolved in a water-immiscible, volatile solvent is first cast onto a substrate in a humid environment. Evaporative cooling leads to condensation of water and the formation of a breath figure array of droplets. The droplet array acts as a sacrificial template for the drying polymer film.

Before the present compositions and methods are described, it is to be understood that as used in the specification and the appended claims, the singular forms "a," "an" and "the" include plural referents unless the context clearly dictates otherwise. Thus, for example, reference to "a polymer" includes more than one polymers, reference to "an organic solvent" includes mixtures of organic solvents, and the like.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed.

Reference will now be made in detail to specific aspects of the disclosed materials, compositions, articles, and methods, examples of which are illustrated in the accompanying Examples.

Provided herein are articles including repellent surfaces, as well as methods of making and using these articles. The articles can comprise a substrate and a repellant surface disposed on a surface of the substrate. The repellant surface can comprise a polymer having a roughened surface. The roughened surface can further comprise a fluorinated silane and a lubricating liquid. The repellent surface, and by extension the articles described herein, can exhibit wetting properties (e.g., superhydrophobicity/superoleophilicity).

The substrate present in the articles can be formed from any material known in the art, such as plastics, glass, fiberglass, ceramic, metals, fused silica, and woven or non-woven fabrics. The substrate can be in any configuration configured to facilitate formation of a coating suitable for use in a particular application. For example, the substrate can be flat, have a cylindrical cross-section, or oval cross-section. In certain embodiments, the substrate can be a liquid-permeable material, such as a mesh, screen, or porous solid. Examples of suitable substrates include polymer substrates, such as polydimethylsiloxane (PDMS), polyethylene terephthalate (PET), polycarbonate (PC), polypropylene (PP), or combinations thereof; glass substrates; metal substrates, such as stainless steel; or a combination thereof. In certain embodiments, the substrate can comprise a mesh or screen (e.g., a stainless steel mesh or screen, or a plastic mesh or screen).

The repellant surface can be derived from any suitable material. For example, the repellant surface can be derived from polymers, polymer blends, compounds, gels, waxes, rubbers, organosilane-based materials, organosiloxane-based materials (e.g. silicone rubbers), silicon, paper, carbon fibres, ceramics, metals, or mixtures thereof. In some instances, the material used to form the repellant surface (for example a polymer) can include a hydrophobic material. As used herein, the term "hydrophobic" refers to a material (such as a polymer) having a water solubility of less than 1 g/100 g water at 20° C. For example, the solubility of the hydrophobic material in water, measured at 20° C., can be 0.8 g/100 g water or less, 0.6 g/100 g water or less, 0.2 g/100 g water or less, 0.1 g/100 g water or less, 0.05 g/100 g water or less, 0.03 g/100 g water or less, or 0.01 g/100 g water or less. The hydrophobicity of the hydrophobic material can be defined by the log of their octanol/water partition coefficient (log P). The higher the numerical value, the more hydrophobic is the monomer. The log P of a polymer can be calculated using MedChem, version 3.54, a software package available from the Medicinal Chemistry Project, Pomona College, Claremont, Calif. In some embodiments, the material can have a log P of 1.6 or greater, (e.g., 1.8 or greater, 2 or greater, 2.2 or greater, 2.3 or greater, 2.5 or greater, 2.6 or greater, from 1.6 to 5, from 1.8 to 5, from 2 to 5, from 2.2 to 5, or from 2.3 to 4.5).

In some examples, the repellant surface can be derived from a polymer. The polymer used to form the repellant surface can comprise any suitable polymer. Preferably, the polymer can be selected to provide mechanical durability and liquid wetting properties. The polymer can be a natural or synthetic polymer. The polymer can be a homopolymer or a copolymer comprising two or more monomers. The copolymer can be random, block, or comprise a combination of random and block sequences. The polymer can in some embodiments be a linear polymer, a branched polymer, or a hyperbranched/dendritic polymer. The polymer can also be a crosslinked polymer.

Examples of suitable polymers that can be used in the articles disclosed herein include, but are not limited to, polyolefins (e.g., polypropylene, polyethylene, polyisobutylene, polymethylpentene, polybutylene, ethylene propylene rubber, and ethylene propylene diene monomer rubber), polyvinyl aromatic polymers (e.g., polystyrene), polybutadiene, ABS (acrylonitrile butadiene styrene copolymers), vinyl polymers (e.g., polyvinyl chloride), copolymers thereof, and blends thereof. In certain embodiments, the polymer comprises a polyalkylene, such as a polypropylene or a polyvinyl aromatic such as polystyrene.

The polymer can have a weight average molecular weight of 10,000 Da or greater. For example, the polymer can have a weight average molecular weight of 25,000 Da or greater, 50,000 Da or greater, 75,000 Da or greater, or 100,000 Da or greater. In some embodiments, the polymer can have a weight average molecular weight of from 25,000 Da to 1,000,000 Da (e.g., from 50,000 Da to 500,000 Da, from 50,000 Da to 250,000 Da, from 100,000 Da to 250,000 Da, or from 100,000 Da to 200,000 Da).

The articles disclosed herein can further comprise a plurality of particles dispersed within the polymer. In some embodiments, the particles can comprise nanoparticles (i.e., the particles can have an average particle size of less than 1 micron), as measured by SEM. In some embodiments, the plurality of particles can have an average particle size of less than 1 micron (e.g., from 1 nm to 150 nm, from 1 nm to 150 nm, from 1 nm to 100 nm, or from 1 nm to 50 nm), as measured by SEM. Examples of suitable nanoparticles include alkaline earth metal oxide nanoparticles, transition metal oxide nanoparticles, lanthanide metal oxide nanoparticles, group IVA oxide nanoparticles, transition metal nanoparticles, transition-metal catalyst nanoparticles, metal alloy nanoparticles, silicate nanoparticles, alumino-silicate nanoparticles, clays, and combinations thereof. In some cases, the particles can be functionalized (e.g., covalently modified with a hydrophobic silane) to increase their hydrophobicity. The particles and the polymer can be present in the substrate at a weight ratio of 10:1 or less (e.g., 9:1 or less, 8:1 or less, 7:1 or less, 6:1 or less, 5:1 or less, 4:1 or less, 3:1 or less, or 2:1 or less).

The polymers present in the articles provided herein can comprise a roughened surface. As used herein, the term "roughened surface" includes both the surface of a three-dimensionally porous material as well as a solid surface having certain topographies, whether they have regular, quasi-regular, or random network of patterns. In certain embodiments, the roughened surface may be a porous surface layer comprising randomly, regularly, or quasi-regularly arranged three-dimensionally interconnected network of pores. In other embodiments, the roughened surface may be a patterned surface layer comprising randomly, regularly, or quasi-regularly arranged two-dimensionally network of patterns. The two-dimensionally network of patterns can include "blind patterns" (or blind pores) and/or interconnected patterns. The porous or patterned designs may be independent of one another, or may be partly in contact with one another. Examples of the porous designs include circles, ellipses, and polygons, e.g., triangles or hexagons. Examples of patterns include a checker pattern, honeycomb pattern, chain pattern, and various geometrical patterns each made up of rectangles closely arranged so as to be partly in contact with one another, and further include linear patterns.

Without wishing to be bound by theory, it is believed that hydrophobic surfaces, such as surfaces derived from a hydrophobic polymer, when roughened, become more hydrophobic. Additionally, air can become trapped between the surface and a liquid coating creating a super hydrophobic surface.

The pores or patterns on the roughened surface can have any arbitrary size and thickness. In some examples, the roughened surface can comprise pores or patterns having an average size of from about 1 nm to about 2 mm. For example, the pores or patterns on the roughened surface can have an average size of less than 1 mm (e.g., less than 750 microns, less than 500 microns, less than 250 microns, less than 200 microns, less than 150 microns, less than 100 microns, less than 50 microns, or less than 25 microns). In some embodiments, the roughened surface can comprise pores or patterns having an average size of at least 1 nm (e.g., at least 5 nm, at least 10 nm, at least 25 nm, at least 30 nm, at least 50 nm, at least 100 nm, at least 500 nm, at least 1 micron, at least 5 microns, at least 50 microns, at least 100 microns, at least 200 microns, at least 300 microns, or at least 500 microns). The size of the pores or patterns can be estimated by porometry analysis and by separate measurement of the bubble point, with a higher bubble point indicating tighter pores.

In specific embodiments, the pores on the roughened surface can have an average size of less than 100 microns (e.g., less than 75 microns, less than 50 microns, less than 25 microns, less than 20 microns, less than 15 microns, less than 10 microns, less than 5 microns, less than 1 micron, less than 500 nm, less than 250 nm, less than 100 nm, less than 75 nm, less than 50 nm, or less than 25 nm). In some embodiments, the roughened surface can comprise pores having an average size of at least 1 nm (e.g., at least 5 nm, at least 10 nm, at least 25 nm, at least 30 nm, at least 50 nm, at least 100 nm, at least 500 nm, at least 1 micron, at least 5 microns, at least 50 microns, or at least 100 microns).

In specific embodiments, the patterns on the roughened surface can have an average size of less than 100 microns (e.g., less than 75 microns, less than 50 microns, less than 25 microns, less than 20 microns, less than 15 microns, less than 10 microns, less than 5 microns, less than 1 micron, less than 500 nm, less than 250 nm, or less than 100 nm). In some embodiments, the roughened surface can comprise patterns having an average size of at least 100 nm (e.g., at least 150 nm, at least 200 nm, at least 300 nm, at least 400 nm, at least 500 nm, at least 750 nm, at least 800 nm, at least 1 micron, at least 5 microns, at least 50 microns, or at least 100 microns).

The roughened surface comprising the pores or patterns can have an average thickness of from about 10 nm to about 2 mm. For example, the roughened surface can have an average thickness of less than 2 mm (e.g., less than 1 mm, less than 750 microns, less than 500 microns, less than 250 microns, less than 200 microns, less than 150 microns, less than 100 microns, less than 50 microns, or less than 25 microns). In some embodiments, the roughened surface can have an average thickness of at least 10 nm (e.g., at least 25 nm, at least 50 nm, at least 100 nm, at least 200 nm, at least 500 nm, at least 750 nm, at least 1 micron, at least 10 microns, at least 100 microns, at least 500 microns, at least 1 mm, at least 1.5 mm, or at least 2 mm). In some embodiments, the thickness of the roughened surface defines from 50% up to 100% of the total thickness of the polymer present on the substrate. For example, the roughened surface can define a thickness that is at least 50%, at least 55%, at least 60%, at least 65%, at least 70%, at least 75%, at least 80%, at least 85%, at least 90%, at least 95%, at least 98%, at least 99%, or up to 100% of the total thickness of the polymer present on the substrate.

The roughened surface can have a pore or pattern density of at least 1 pore or pattern per 10 $\mu m^2$. In some embodiments, the roughened surface can have a pore or pattern density of at least 2, at least 4, at least 5, at least 10, at least 15, at least 20, at least 25, at least 30, at least 35, at least 45, or at least 50 pores or patterns per 10 $\mu m^2$. In some embodiments, the roughened surface can have a pore or pattern density of 100 or less, 90 or less, 80 or less, 70 or less, 50 or less, 40 or less, 25 or less, 20 or less, 15 or less, or 10 or less, pores or patterns per 10 $\mu m^2$. Pore or pattern density can be determined for a given surface by, for example, viewing a scanning electron micrograph of the surface of interest of a given square surface area and calculating the number of pores in the given area. The number of pores or patterns calculated to be in a given square area can be normalized to a particular reference area through a simple ratio.

The wetting properties of the roughened surface can be varied, for example, through the polymer used and/or the number of pores or patterns on the polymer. In some embodiments, the roughened surface can exhibit a water contact angle of at least 100° (e.g., at least 105°, at least 110°, at least 115°, or at least 120°). In some instances, the polymer can exhibit an increase in water contact angle of at least 5° due to the increase in surface roughness. For example, the polymer can exhibit an increase in water contact angle of at least 10°, at least 15°, at least 20°, at least 25°, or at least 30°, due to the increase in surface roughness.

The polymer comprising the roughened surface can exhibit good scrub resistance (also referred to herein as "wear resistance"). In some embodiments, the polymer comprising the roughened surface can exhibit scrub resistance of at least 50 cycles at 10 mN (e.g., at least 100 cycles, at least 150 cycles, at least 200 cycles, at least 300 cycles, at least 400 cycles, at least 500 cycles, at least 600 cycles, at least 700 cycles, at least 800 cycles, at least 900 cycles, at least 1,000 cycles, at least 1,100 cycles, at least 1,200 cycles, at least 1,300 cycles, at least 1,400 cycles, or at least 1,500 cycles) as measured in accordance with the methods described herein. In some embodiments, the polymer comprising the roughened surface can exhibit scrub resistance of 2,000 cycles or less (e.g., 1,500 cycles or less, 1,200 cycles or less, 1,000 cycles or less, or 500 cycles or less) as measured in accordance with the methods described herein.

The polymer comprising the roughened surface can exhibit a scrub resistance ranging from any of the minimum values described above to any of the maximum values described above. For example, the polymer comprising the roughened surface can exhibit a scrub resistance of from 50 cycles to 2,000 cycles. The scrub resistance of the polymer comprising the roughened surface can be measured using any suitable method described herein. Briefly, the repellent surface can be worn using a ball-on-flat tribometer using a 3-mm diameter sapphire ball at 10 mN loading on a porous polypropylene surface or borosilicate ball with radius 15 $\mu m$ mounted on a rectangular cantilever with a nominal spring constant. The contact pressure can be from 10 to 15 MPa, depending on the load, elastic modulus of the surface, and the diameter of the ball in a ball on flat test. To analyze the change in morphology of the surface before and after the wear experiment, height scans of 100×100 $\mu m^2$ in area can be obtained using a Si, n-type ($Si_3N_4$) tip with an Al coating operating in tapping mode. Root mean square roughness (RMS) values before and after wear experiments can be obtained.

The polymer comprising the roughened surface can further comprise a functional material disposed on a surface thereof. For example, the roughened surface can comprise a functional material disposed on a surface thereof. The functional material can modulate the surface chemistry (and by extension physical properties) of the repellent surface. Thus, by incorporating a functional material, various properties of the repellent surface, including the hydrophobicity and/or oleophobicity of the coating, can be tuned.

The functional material can include any suitable material based on the desired surface properties of the coating. In some embodiments, the functional material can comprise an oleophilic material, an oleophobic material, a hydrophobic material, a hydrophilic material, or combinations thereof. In certain embodiments, the functional layer can comprise a hydrophilic/oleophilic material, a hydrophobic/oleophilic material, a hydrophobic/oleophobic material, or a hydrophilic/oleophobic material.

The functional layer can be derived from any suitable material, including polymers and small molecules. In some cases, the functional material can comprise a low surface energy material, such as a fluorosilane, a fluorosurfactant, a fluoropolymer, or a combination thereof. In some embodiments, the functional material can include a silane. The silane can be halogenated or non-halogenated. In some embodiments, the silane can comprise an alkyl chain, a partially fluorinated alkyl chain, and/or an alkyl chain that has regions that are perfluorinated, any of which may be straight or branched. In some examples, the silane group can comprise one or more perfluorinated aliphatic moieties. In certain embodiments, the functional material can comprise a fluorosilane.

In some examples, the functional material can comprise a silane represented by a general Formula below $$CH_3(CH_2)_m SiR^1 R^2 R^3 \qquad \qquad I,$$

$$CF_3(CF_2)_n(CH_2)_m SiR^1 R^2 R^3 \qquad \qquad II, or$$

$$CHF_2(CF_2)_n(CH_2)_m SiR^1 R^2 R^3 \qquad \qquad III$$

where n and m are integers (n is 0 or greater, and m is 0 or greater), and $R^1$, $R^2$, and $R^3$ are independently a halogen, alkyl, or alkoxy group.

In some embodiments, the functional material can comprise one or more silanes represented by Formulas I-III. In some examples, the functional material can comprise perfluoroalkyltrichlorosilane, perfluoroalkyl(alkyl)dichlorosilane, perfluoroalkyl(alkyl)dialkoxysilanes, of perfluoroalkyltrialkoxysilanes. Specifically, the functional layer can comprise perfluorododecyltrichlorosilane, perfluorotetradecyltrichlorosilane, perfluorooctyltrichlorosilane, perfluorodecyltrimethoxysilane, perfluorododecyltrimethoxysilane, perfluorotetradecyltrimethoxtsilane, perfluorooctyltrimethoxysilane, perfluorodecyltriethoxysilane, perfluorododecyltrimethoxysilane, perfluorotetradecyltriethoxysilane, perfluorooctyltrimethoxysilane, and perfluorodecylmethyldichlorosilane.

In some embodiments, the functional material can include a fluorosurfactant. Suitable flourosurfactants can include anionic fluorosurfactants, cationic fluorosurfactants, amphoteric fluorosurfactants, non-ionic fluorosurfactants, and combinations thereof. Examples of suitable fluorosurfactants include those sold under the tradenames FLEXIPEL™, ZONYL®, CAPSTONE®, and MASURF®. Specific examples of suitable fluorosurfactants include FLEXIPEL™ AM-101 partially fluorinated polymer, ZONYL® 9361 anionic fluorosurfactant, CAPSTONE® FS-50 anionic fluorosurfactant, CAPSTONE® FS-63 anionic fluorosurfactant, and MASURF® FP-815CP anionic fluoroacrylate copolymer.

The functional material can be uniformly distributed across the roughened surface. Alternatively, the functional material can be patterned. For example, the functional material can be present at some points on the roughened surface and absent at others, such that the functional material is present at some points on the surface of the roughened substrate while the roughened surface on the substrate without the functional material are present at other points on the surface of the substrate. In other cases, the functional layer can be patterned such that the composition of the functional material varies at different points on the substrate, such that a first functional material is present at some points on the surface of the substrate and a second functional material is present at some points on the surface of the substrate. When the functional material is patterned, the pattern of the functional material can be random or ordered.

In some embodiments, the functional material can have a thickness of 100 nanometers or less (e.g., 50 nanometers or less, 25 nanometers or less, 20 nanometers or less, 10 nanometers or less, or 5 nanometers or less). In some embodiments, the functional material can have a thickness of from 1 nanometer to 100 nanometers (e.g., from 1 to 80 nanometers, from 5 to 80 nanometers, from 1 to 50 nanometers, from 5 to 50 nanometers, from 1 to 20 nanometers, from 5 to 20 nanometers, from 1 to 10 nanometers, or from 5 to 10 nanometers).

The wetting properties of the functional material used can be varied. In some embodiments, the roughened surface can exhibit a water contact angle of at least 120° (e.g., at least 125°, at least 130°, or at least 135°), a hexadecane contact angle of at least 90° (e.g., at least 95°, at least 100°, or at least 105°), or both a water contact angle of at least 120° (e.g., at least 125°, at least 130°, or at least 135°) and a hexadecane contact angle of at least 90° (e.g., at least 95°, at least 100°, or at least 105°) following deposition of the functional material on the roughened surface. This altering of the surface energy of the roughened surface can facilitate the lubricating fluid (which can be for example, a lower surface tension fluorinated oil) will remain impregnated in the roughed surface and will not be preferentially replaced by the foreign material to be repelled.

The articles disclosed herein can further include a lubricating fluid. The pores or patterns can be impregnated or filled with lubricant to provide lubricant-filled pores or patterns. The lubricant-filled pores or patterns can provide a reservoir for lubricant and allow the lubricant to move outward towards the surface, where a lubricant overlayer is formed. The lubricant layer forms a smooth and liquid layer on which particles, microbes and other liquids do not adhere or grow. Alternatively, the lubricating fluid can be uniformly distributed across the substrate surface. For example, the lubricating fluid can form a coating on the porous or patterned polymer surface.

In the articles disclosed herein, the lubricating fluid can include a liquid selected, for example, based upon its immiscibility or low enthalpy of mixing with solid or liquid object to be repelled. Lubricant can also be selected based on the availability or desired surface properties (hydrophilicity, oleophobicity, etc.). Exemplary lubricating liquids include hydrophilic, hydrophobic and oleophobic liquids, such as fluorinated lubricants (liquids or oils), silicones, mineral oil, plant oil, water (or aqueous solutions including physiologically compatible solutions), ionic liquids, polyolefins, including polyalpha-olefins (PAO), synthetic esters, polyalkylene glycols (PAG), phosphate esters, alkylated naphthalenes (AN), aromatics and silicate esters or mixtures of any of the above, if preferred.

Suitable examples of lubricating fluids that can be used include for example, fluorinated hydrocarbon such as perfluorinated hydrocarbons or organosilicone compound (e.g. silicone elastomer). In particular, the tertiary perfluoroalkylamines (such as perfluorotri-n-pentylamine, FC-70 by 3M, or perfluorotri-n-butylamine FC-40), perfluoroalkylsulfides and perfluoroalkylsulfoxides, perfluoroalkylethers, perfluorocycloethers (like FC-77) and perfluoropolyethers (such as KRYTOX family of lubricants by DuPont), perfluoroalkylphosphines and perfluoroalkylphosphineoxides as well as their mixtures can be used for these applications, as well as their mixtures with perfluorocarbons. In addition, long-chain perfluorinated carboxylic acids (e.g., perfluorooctadecanoic acid and other homologues), fluorinated phosphonic and sulfonic acids, fluorinated silanes, and combinations thereof can be used as the lubricating fluid. The perfluoroalkyl group in these compounds could be linear or branched and some or all linear and branched groups can be only partially fluorinated. Other exemplary lubricants include hydrophobic or oleophobic oils such as silicone oil, mineral oil, perfluorinated oil, a food safe oil, a vegetable oil or mixtures of any of the above.

The lubricating fluid can fill from 50% up to 100% of the pores or patterns of the polymer material (that is, the roughened surface). For example, the lubricating fluid can fill at least 50%, at least 55%, at least 60%, at least 65%, at least 70%, at least 75%, at least 80%, at least 85%, at least 90%, at least 95%, at least 98%, at least 99%, or up to 100% of the pores or patterns in the roughened surface.

As disclosed herein, the lubricating fluid can also form a layer on the roughened surface. The thickness of the lubricating fluid on the roughened surface can be varied depending on the desired properties of the lubricating fluid and/or applications for the article. In some cases, the lubricating fluid can have a thickness of from 50 nanometers to 2 microns (e.g., from 400 nanometers to 2 microns, from 500 nanometers to 2 microns, from 500 nanometers to 1.5 micron, from 100 nanometers to 800 nanometers, or from 500 nanometers to 1 micron). In some cases, the lubricating fluid disclosed herein can have a thickness of less than 1 micron (e.g., less than 750 nanometers). In some embodiments, the repellent coatings can have a thickness of from 100 nm to 800 nm, or from 400 nm to 800 nm.

The wetting properties of the lubricating fluid can be varied. In some embodiments, the repellant surface can exhibit a water contact angle of at least 100° (e.g., at least 105°, at least 110°, or at least 115°), a hexadecane contact angle of at least 65° (e.g., at least 70°, at least 75°, or at least 80°), or both a water contact angle of at least 100° (e.g., at least 105°, at least 110°, or at least 115°) and a hexadecane contact angle of at least 65° (e.g., at least 70°, at least 75°, or at least 80°) following deposition of the lubricating liquid on the roughened surface.

The repellant surface can exhibit a water tilt angle of less than 10° (e.g., 9° or less, 8° or less, 7° or less, 6° or less, 5° or less, 4° or less, 3° or less, or 2° or less) a hexadecane tilt angle of less than 10° (e.g., 9° or less, 8° or less, 7° or less, 6° or less, 5° or less, 4° or less, 3° or less, or 2° or less) following deposition of the lubricating liquid on the roughened surface.

The low tilt angle means that liquid droplets placed on the surface are able to slide around the surface with very little tilting. Droplets of hexadecane added to untreated polypropylene, for example, spreads readily and then spreads further when the surface is tilted. In contrast, on the liquid-impregnated surface, the hexadecane droplet has less incentive to spread and so retains a more spherical shape. In addition, as the liquid-impregnated surface is tilted, the hexadecane droplet slides across the surface with very little resistance.

In certain embodiments, the repellent surface (and by extension the articles described herein) can exhibit superomniphobic or superhydrophobic properties. The term superomniphobic as used herein refers to a material that will repel both Newtonian and non-Newtonian fluids of just about any kind. As such, these articles can exhibit various desirable properties, such as, for example, self-cleaning, anti-fouling, anti-smudge, and anti-icing properties. In some embodiments, the repellent coating can impart microbial resistance to an article, moisture resistance to an article (e.g., metallic surface or other surfaces including wooden or ceramic surface), anti-fouling properties to an article (e.g., a surfaces, filters, membranes, or actuator). In some cases, the article can be a packaging material, an anti-fingerprint surface, a self-cleaning and dirt-repellent surface, a miniaturized sensors or other devices, an implantable device (e.g., a biochip, biosensor, or other medical device), a floating device such as a swimsuit, in oil tankers to prevent oil leakage, a thermal insulator in clothing, cooking ware, a material with low permittivity, a selective membrane, an air filter, or an article used in liquid extraction from mixtures.

Specific examples of articles on which the repellent coatings described herein can be applied can include, windows; windshields on automobiles aircraft, and watercraft; freezer doors; condenser pipes; ship hulls; underwater vehicles; underwater projectiles; airplanes and wind turbine blades; indoor and outdoor mirrors; lenses, eyeglasses or other optical instruments; protective sports goggles; masks; helmet shields; glass slides of frozen food display containers; glass covers; buildings walls; building roofs; exterior tiles on buildings; building stone; painted steel plates; aluminum panels; window sashes; screen doors; gate doors; sun parlors; handrails; greenhouses; traffic signs; transparent soundproof walls; signboards; billboards; guardrails; road reflectors; decorative panels; solar cells; painted surfaces on automobiles watercraft, aircraft, and the like; painted surfaces on lamps; fixtures, and other articles; air handling systems and purifiers; kitchen and bathroom interior furnishings and appliances; ceramic tiles; air filtration units; store showcases; computer displays; air conditioner heat exchangers; high-voltage cables; exterior and interior members of buildings; window panes; dinnerware; walls in living spaces, bathrooms, kitchens, hospital rooms, factory spaces, office spaces, and the like; sanitary ware, such as basins, bathtubs, closet bowls, urinals, sinks, and the like; and electronic equipment, such as computer displays.

Methods

Also provided are methods of forming repellent surface on a substrate. Methods of forming repellent surface on a substrate can comprise preparing polymer solution comprising a polymer dissolved within a solvent and adding a non-solvent to the polymer solution to produce a casting mixture. The casting mixture can comprise the polymer dispersed in a solvent a non-solvent mixture. Non-limiting examples of suitable solvents include organic aliphatic solvents (e.g., pentane, hexanes, octane, cyclohexane); aromatic and/or alkylated aromatic solvents such as benzene, toluene, xylene, naphthalene derivatives; hydrocarbon solvents; dichloromethane, chloroform, alcohols (e.g., methanol, ethanol, isopropanol); esters (e.g., ethyl acetate); ketones (e.g., acetone); diethyl ether; dioxane; glycol ethers and glycol ether esters; tetrahydrofuran; dimethylformamide; acetonitrile; dimethyl sulfoxide; water, and combinations thereof. Other examples of suitable solvents include mineral oils from the aliphatic or isoparaffinic series, mixtures of aromatic and aliphatic hydrocarbons; halogenated aromatic or aliphatic hydrocarbons; vegetable, seed or animal oils such as soybean oil, rape seed oil, olive oil, castor oil, sunflower seed oil, coconut oil, corn oil, cotton seed oil, linseed oil, palm oil, peanut oil, safflower oil, sesame oil, tung oil and the like, and $C_1$-$C_6$ mono-esters derived from vegetable, seed or animal oils; $C_1$-$C_6$ dialkyl amides of $C_6$-$C_{20}$ saturated and unsaturated aliphatic carboxylic acids; $C_1$-$C_{12}$ esters of aromatic carboxylic acids and dicarboxylic acids and $C_1$-$C_{12}$ esters of aliphatic and cyclo-aliphatic carboxylic acids; $C_4$-$C_{12}$ polyesters of dihydric, trihydric, or other lower polyalcohols such as, propylene glycol dioleate, di-octyl succinate, di-butyl adipate, di-octyl phthalate, and the like.

The relative proportions of polymer and solvent in the polymer solution can be in a weight ratio of at least 1:100 (e.g., at least 1:50, at least 1:40, at least 1:30, at least 1:20, at least 1:10, at least 1:1, at least 10:1, at least 20:1, at least 30:1, at least 40:1, or at least 50:1). In some embodiments, the relative proportions of polymer and solvent in the polymer solution can be in a ratio of 50:1 or less (e.g., 40:1 or less, 30:1 or less, 20:1 or less, 10:1 or less, 5:1 or less, 1:1 or less, 1:5 or less, 1:10 or less, 1:20 or less, 1:30 or less, 1:40 or less, or 1:50 or less). In some embodiments, the relative proportions of polymer and solvent in the polymer solution can be in a ratio of from 1:100 to 50:1 (e.g., from 1:100 to 1:1, from 1:50 to 50:1, from 1:50 to 20:1, from 1:50 to 1:1, from 1:20 to 50:1, or from 1:10 to 10:1).

The non-solvent can include a polar solvent, for example. Non-limiting examples of suitable non-solvents include one or more of ethers like tetrahydrofuran and the like, alkylene glycol dialkyl ethers such as ethylene glycol diethyl ether and the like, amides such as dimethylacetamide or N-methylpyrrolidone and the like, ketones such as acetone, methyl ethyl ketone and the like, nitriles such as butyronitrile and the like, sulfoxides or sulfones such as dimethyl sulfoxide or sulfolane and the like, and alkylene carbonates such as propylene or butylene carbonate and the like.

The relative proportions of solvent and non-solvent in the casting mixture can be in a volume ratio of at least 1:2 (e.g., at least 1:1, at least 2:1, at least 5:1, at least 10:1, at least 15:1, at least 20:1, at least 25:1, at least 30:1, at least 40:1, at least 50:1, at least 60:1, at least 70:1, at least 80:1, at least 90:1, or at least 100:1). In some embodiments, the relative proportions of solvent and non-solvent in the casting mixture can be in a volume ratio of 100:1 or less (e.g., 90:1 or less, 80:1 or less, 70:1 or less, 60:1 or less, 50:1 or less, 40:1 or less, 30:1 or less, 20:1 or less, 10:1 or less, 8:1 or less, 6:1 or less, 5:1 or less, 2:1 or less, 1:1 or less, or 1:2 or less). In some embodiments, the relative proportions of solvent and non-solvent in the casting mixture can be in a ratio of from 100:1 to 1:2 (e.g., from 50:1 to 1:2, from 10:1 to 1:2, from 10:1 to 1:1 or from 5:1 to 2:1).

The casting mixture or polymer solution can be deposited on a substrate surface using any suitable casting technique. Examples of suitable casting techniques can include spray coating, dip coating, spin coating, flow coating, knife casting, film casting, vacuum-assisted dip-deposition, plasma deposition, or chemical vapor deposition. Dip coating includes a process in which a solution or mixture is contacted with the substrate surface. Excess mixture is permitted to drain from the substrate surface, and the solvent and non-solvent in the mixture are evaporated at ambient or elevated temperature. Knife casting include a process in which a knife is used to draw the solution or mixture across the substrate surface to form a thin film of the dispersion of uniform thickness. In certain embodiments, the casting mixture or polymer solution can be deposited on the substrate surface by spray coating.

After casting, the solvent and non-solvent in the casting mixture or polymer solution can be evaporated at ambient or elevated temperatures. In some embodiments, the solvent and non-solvent in the casting mixture can be evaporated at elevated temperatures of about 60° C. or greater, such as 80° C. or greater, 100° C. or greater, 120° C. or greater, 150° C. or greater, from about 60° C. to about 250° C. or from about 80° C. to about 200° C. After evaporation of the solvent and non-solvent from the casting mixture, a roughened surface may be provided.

In an alternate embodiment, the method can include evaporating the solvent from the polymer solution at ambient temperature and under an atmosphere comprising water vapor to provide the substrate having a roughened surface. The mixture's exposure to air creates surface pores on the exposed side. The term "ambient temperature" as used herein refers to the temperature of the environment in which any physical or chemical event occurs, unless otherwise specified. A general range of ambient temperatures is any temperature less than 20° C. such as from 20° C. to less than 100° C., from 20° C. to less than 40° C., or from 20° C. (68° F.) to 25° C. (77° F.), though ambient temperatures could include temperatures that are higher or lower than this range. The solvent can be evaporated from the polymer solution at relative humidity conditions around the polymer solution.

In some embodiments, the atmosphere can have a relative humidity of at least about 30% (e.g., at least about 40%, at least about 50%, at least about 60%, at least about 70%, at least about 80%, or at least about 90%). In some embodiments, the atmosphere can have a relative humidity of less than 100% (e.g., less than about 90%, less than about 80%, less than about 70%, less than about 60%, less than about 50%, or less than about 40%).

The atmosphere can have a relative humidity ranging from any of the minimum values described above to any of the maximum values described above. For example, is some cases, the atmosphere can have a relative humidity ranging from about 30% to about 100% (e.g., from about 50% to about 60%).

The diameter of the surface pores or patterns can be varied through the length of the exposure time as well as through the humidity of the atmosphere. In exposure to the air, any water vapor in the air acts to precipitate the polymer at and in a region below the exposed liquid film surface. In general, the greater the humidity the larger the surface pores, and conversely the lower the humidity the tighter the surface. Further, the density of the surface pores or patterns can be varied through altering the polymer concentration. A more concentrated polymer solution can lead to a decrease in pore or pattern density (due to, for example, thicker polymer walls around the pores) and a decrease in polymer concentration can lead to an increase in pore or pattern density.

In some embodiments, methods of forming repellent surface on a substrate can further comprise activating the roughened surface and depositing a functional material on the activated roughened surface. Activating the roughened surface can comprise, for example, ultraviolet (UV) treatment of the roughened surface, ultraviolet-ozone (UVO) treatment of the roughened surface, plasma treatment of the roughened surface, or a combination thereof. The functional material can be deposited on the activated roughened surface using any suitable method, such as film casting, spin coating, dip coating, spray coating, flow coating, vapor deposition, knife casting, film casting, vacuum-assisted dip-deposition, plasma deposition, or a combination thereof.

In some embodiments, methods of forming repellent surface can further comprise introducing a lubricating fluid under conditions effective for the lubricating fluid to impregnate the roughened surface. The lubricating fluid can be introduced on the roughened surface using any suitable casting technique. Examples of suitable casting techniques can include spray coating, dip coating, spin coating, flow coating, knife casting, film casting, vacuum-assisted dip-deposition, plasma deposition, or chemical vapor deposition. In certain embodiments, the lubricating fluid can be deposited on the roughened surface by dip coating.

As discussed above, the articles described herein can exhibit tunable liquid repellency, making them useful in a wide range of applications including in oil-water separation. Accordingly, provided herein are methods of separating fluid mixtures comprising a first liquid and a second liquid. For example, the articles can be used to separate a polar liquid from a non-polar liquid. "Polar" as used herein, refers to a fluid having molecules whose electric charges are not equally distributed and are therefore electronically charged. Polar fluids are immiscible or hardly miscible with non-polar or hydrophobic fluids. "Non-polar" as used herein refers to a hydrophobic fluid. Non-polar fluids are immiscible, or hardly miscible with polar fluids such as for example water. The dielectric constant of a non-polar fluid is usually lower than that of water. Examples of a hydrophobic liquids include aliphatic hydrocarbons such as octanol, dodecane, or hexadecane. In some examples, the articles can be used to separate a mixture of water and a non-polar liquid, such as an aliphatic hydrocarbon.

Methods of using the articles can include contacting the article (e.g., on the side comprising the repellent surface) with the fluid mixture under conditions effective to afford permeation of the polar liquid or the non-polar liquid. In some embodiments, the method can include withdrawing from the reverse side of the article a permeate containing at least one liquid, wherein the liquid is selectively removed from the fluid mixture. The permeate can comprise at least one liquid in an increased concentration relative to the feed stream. The term "permeate" refers to a portion of the feed stream which is withdrawn at the reverse or second side of the article, exclusive of other fluids such as a sweep gas or liquid which may be present at the second side of the article.

In some embodiments, the article can be selective to the polar liquid versus the non-polar liquid. In some embodiments, the article can be selective to the non-polar liquid versus the polar liquid. In some embodiments, the article can be impermeable to both the polar liquid and the non-polar liquid. The article can be used to separate fluids at any suitable temperature, including temperatures of 100° C. or greater. For example, the article can be used at temperatures of from 100° C. to 180° C. In some embodiments, the coating can be used at temperatures less than 100° C.

In some embodiments, the repellent coating can exhibit a water contact angle of less than 10° and a hexadecane contact angle of at least 150°, and the method can comprise contacting the article with a liquid mixture comprising an aqueous phase (e.g., water) and an organic phase (e.g., an oil) under conditions effective to afford permeation of the aqueous phase through the article. In certain of these embodiments, the article can be, for example, a mesh or screen coated with the repellent coating.

In some embodiments, the repellent coating can exhibit a water contact angle of at least 150° and a hexadecane contact angle of less than 10°, and the method can comprise contacting the article with a liquid mixture comprising an aqueous phase (e.g., water) and an organic phase (e.g., an oil) under conditions effective to afford permeation of the organic phase through the article. In certain of these embodiments, the article can be, for example, a mesh or screen coated with the repellent coating.

EXAMPLES

The following examples are set forth below to illustrate the compositions, methods, and results according to the disclosed subject matter. These examples are not intended to be inclusive of all aspects of the subject matter disclosed herein, but rather to illustrate representative methods, compositions, and results. These examples are not intended to exclude equivalents and variations of the present invention, which are apparent to one skilled in the art.

Efforts have been made to ensure accuracy with respect to numbers (e.g., amounts, temperature, etc.) but some errors and deviations should be accounted for. Unless indicated otherwise, parts are parts by weight. There are numerous variations and combinations of reaction conditions, e.g., component concentrations, temperatures, pressures, and other reaction ranges and conditions that can be used to optimize the product purity and yield obtained from the described process. Only reasonable and routine experimentation will be required to optimize such process conditions.

Example 1

Mechanically Durable Liquid-Impregnated Honeycomb Surfaces

One approach for the fabrication of porous surfaces is to utilize breath figures. Breath figures are two-dimensional hexagonally packed arrays of water droplets condensed onto a cooled surface. Such a breath figure can form on a drying polymer film surface, so long as the solvent used to cast the film is immiscible with water. Evaporation of the solvent leads to evaporative cooling of the film surface, resulting in water condensation and the formation of a breath figure array. Droplet coalescence is limited either by the increasing viscosity of the drying polymer film or by precipitation of the polymer at the water-solvent interface. This array of water droplets acts as a template for the drying polymer solution leading to the formation of the porous surface structure once the solvent and water have fully evaporated. Based on their appearance, such breath figure-templated surfaces are commonly called honeycomb surfaces.

Polystyrene is a common polymer used in the creation of honeycomb surfaces. Here, polystyrene honeycomb films are created on glass and polymer substrates and further treated with UV irradiation and fluorosilane coupling to ensure the lubricating liquid will remain impregnated within the polymer structure and no preferential dewetting will occur when the liquid to be repelled is added to the surface. The chemically modified honeycomb surfaces were then dipped into the lubricating liquid. The repellency of these liquid impregnated honeycomb surfaces was tested against water and hexadecane. The mechanical durability of these surfaces was investigated through the use of macrowear experiments.

Methods

In order to achieve the porous structures required for creating liquid-impregnated surfaces, the surfaces described in this example comprise polystyrene coatings cast in a volatile, water-immiscible solvent and allowed to dry in a humid environment, FIG. 1. The honeycomb surface is then activated using UV irradiation and treated with fluorosilane to better to ensure the impregnating liquid will preferably wet the surface. The surface is then dipped in the impregnating liquid to result in a liquid repellent surface.

Samples: Glass slides (Fisher Scientific) and polypropylene sheet (PP, ASTM D4101-0112, SPI) cut to dimensions of 15 by 15 mm were used as substrates. 0.2 g of polystyrene (Mw ~350,000, Sigma Aldrich) was dissolved in 10 mL chloroform (Mallinckrodt) at room temperature. Once the polymer was fully dissolved, a droplet of the solution was added to the glass surface at room temperature and ambient humidity (54% RH) and the surface was dried in air. To activate the polymer surface for silane attachment, samples were UV irradiated for 30 min (15 W, $\lambda_{max}$=254 nm). Samples were fluorinated via chemical vapor deposition of a silane (to lower surface energy), which was required in order to ensure preferential wetting by the lubricating liquid. One drop of trichloro(1H,1H,2H,2H-perfluorooctyl) silane (fluorosilane, Sigma Aldrich) was deposited next to the samples which were covered and left for 2 h. The sample was then dipped into the impregnating liquid, in this instance a perfluoropolyether (Krytox GPL 102, Dupont) with a chemical structure of F—(CF(CF$_3$)—CF$_2$—O)$_n$—CF$_2$CF$_3$ where n=10-60, a surface tension of 16-20 mN m$^{-1}$, and a viscosity of 38 cSt.

Contact angle and tilt angle: For contact angle data, droplets of both water (5 μL, surface tension 72 mN m$^{-1}$) and n-hexadecane (5 μL, 99%, Alfa Aesar, surface tension 27 mN m$^{-1}$ ref 24) were dispensed onto the surface of samples using a goniometer (Model 290, Ramé-Hart Inc.) with the resulting droplet shape analyzed with DROP image software. Tilt angles were determined by moving the surface until the 5-μL droplet was observed to slide off. All angles reported are the average of five separate measurements performed on different areas of a sample.

Optical imaging: Optical images were taken with a CCD camera (Nikon Optihot-2) to determine the topography of the polystyrene samples.

Wear experiments: The mechanical durability of the surfaces was examined through macrowear experiments performed with an established procedure of using a ball-on-flat tribometer. Briefly, a 3-mm sapphire ball with an applied load of 10 mN normal to the surface was put into reciprocating motion for 200 cycles (stroke length=6 mm, average linear speed=1 mm s-1). Optical images were taken before and after the experiment to track the formation of a wear scar.

Contact pressures were calculated based on Hertz analysis. For the surface, an elastic modulus of 3 GPa and a Poisson's ratio of 0.35 were used. For the sapphire ball, an elastic modulus of 390 GPa and Poisson's ratio of 0.23. The mean contact pressure was calculated as 14 MPa.

TABLE 1

Comparison of static contact angles and tilt angles for water and hexadecane droplets deposited on polystyrene surfaces.

| Surface | Water | | Hexadecane | |
|---|---|---|---|---|
| | Contact angle (°) | Tilt angle (°) | Contact angle (°) | Tilt angle (°) |
| Flat PS | 94 ± 1 | N/A | 31 ± 2 | N/A |
| Honeycomb PS | 107 ± 2 | N/A | 11 ± 2 | N/A |
| Honeycomb PS + fluorosilane | 138 ± 2 | N/A | 107 ± 2 | N/A |
| Honeycomb PS + fluorosilane + lubricating liquid | 109 ± 2 | 2 ± 1 | 70 ± 1 | 4 ± 2 |

Results and Discussion

Figure 2:
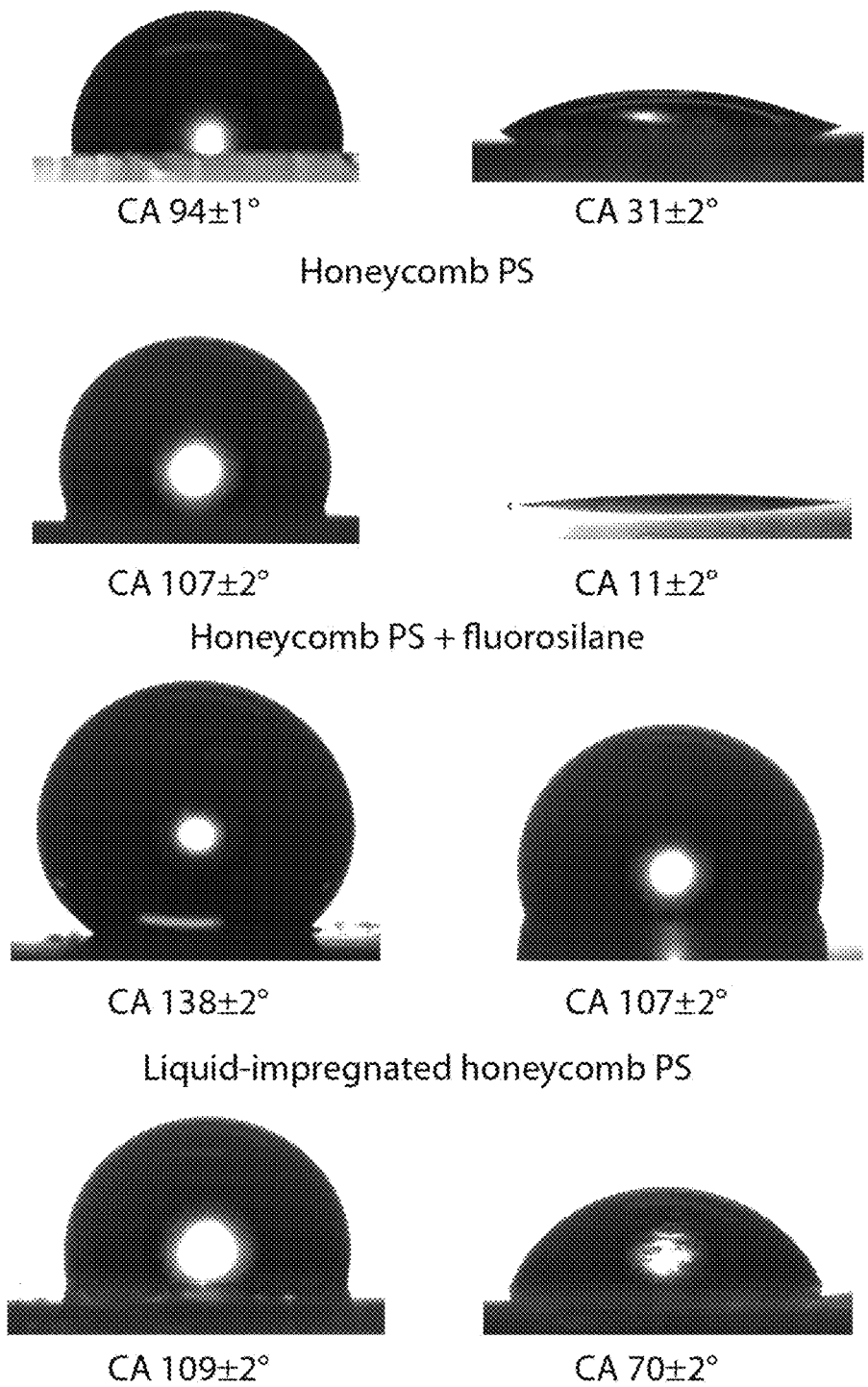
FIG. 2 shows contact angle images for water droplet and hexadecane droplet on polystyrene surfaces.
Figure 3:
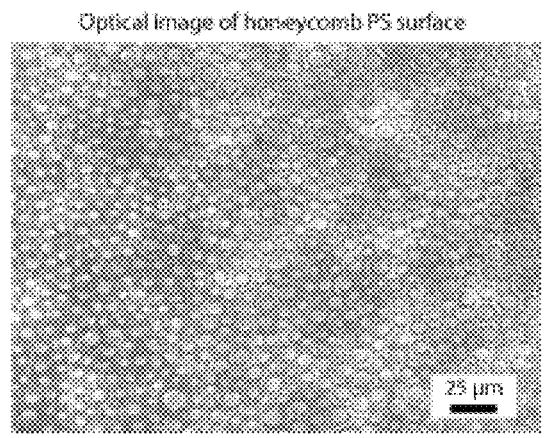
FIG. 3 shows optical images of a honeycomb surface on glass after solvent casting polystyrene from a water-immiscible, volatile solvent in a humid environment.

Flat polystyrene (PS) is found to be slightly hydrophobic with water contact angles of 94±1°, Table 1 and FIG. 2. In order to create the porous polymer surface, polystyrene was dissolved in a water immiscible, volatile solvent. A drop of the solution was cast onto a substrate and dried in a humid environment at room temperature. Evaporative cooling of the drying polymer film results in the condensation of water droplets and the formation of a breath figure. This array of water droplets acts as a sacrificial template for the drying polymer film and, once evaporation of the solvent and water is complete, results in a porous, honeycomb surface structure, FIG. 3. Fully dried, the polystyrene honeycomb surface was found to have a water contact angle of 107±2° due to the increase in surface roughness.

Figure 4:
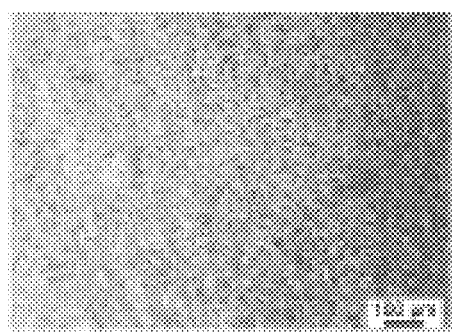
FIG. 4 shows optical micrographs before and after wear experiments using ball-on-flat tribometer using a 3-mm diameter sapphire ball at 10 mN loading on a honeycomb surface.
Figure 4:
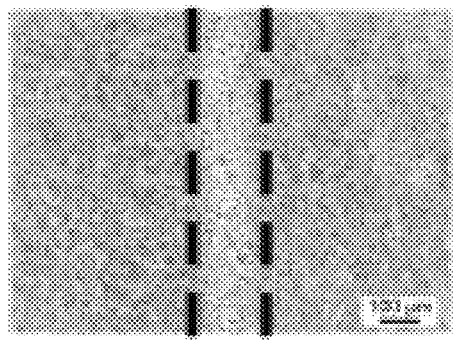

The mechanical durability of the polystyrene honeycomb surface was investigated through the use of tribometer wear experiments and the resulting optical images, showing a portion of the wear track, are displayed in FIG. 4. The wear experiments were carried out with a load of 10 mN, with the tribometer put in reciprocating motion for 200 cycles. The images confirm that the polymer coating is not removed from the glass substrate. The density of the honeycomb structure appears to decrease in the wear location due to plastic deformation of the polymer. However, the porous structure is not completely destroyed, allowing for the impregnating liquid to remain in the wear region. It is believed that these surfaces can likely be more durable than many other examples of liquid-impregnated surfaces, which typically rely on poorly adhered wax coatings or delicate surface structures.

For the lubricating liquid to fully penetrate the porous surface, the chemistry of the honeycombs was altered, ensuring favorable wetting and no preferential dewetting when another liquid is added on top of the lubricating liquid layer. The polystyrene honeycomb coating was activated via UV irradiation to activate the surface for silane attachment.

Following fluorosilane treatment, the polystyrene honeycomb surface displayed water contact angles of 138±2° and hexadecane contact angles of 107±2°, FIG. 2. This altering of the surface energy is shown to ensure that the lubricating liquid, in this case a lower surface tension fluorinated oil, will remain impregnated in the honeycomb structure and will not be preferentially replaced by the liquid to be repelled.

Finally, the honeycomb surface was dipped into the lubricating liquid. Following this, the liquid-impregnated surface exhibited water contact angles of 109±2° and hexadecane contact angles of 70±2°, FIG. 2. However, due to the presence of the lubricating liquid, the surface displays very low tilt angles of 2±1° and 4±2° for water and hexadecane respectively, Table 1. Because the low tilt angles are a product of the homogeneity of the liquid-liquid interface, the surface tension of the liquid being repelled has little effect on the repellency of the surface.

Figure 5:
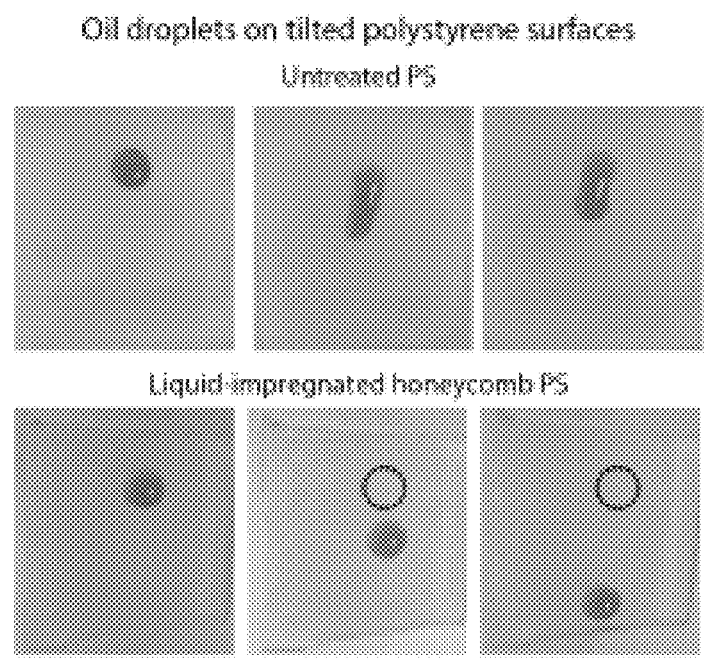
FIG. 5 shows photographs demonstrating hexadecane repellency of liquid-impregnated honeycomb surface compared to a fluorinated honeycomb sample.

The low tilt angle means that liquid droplets placed on the surface are able to slide over the surface easily. In FIG. 5, droplets of hexadecane were added to fluorosilane-treated honeycomb and liquid-impregnated honeycomb surfaces. Hexadecane droplets on the fluorosilane-treated surface are not easily removed when the surface is titled due to high hysteresis and droplet pinning. In contrast, as the liquid-impregnated surface is tilted, the hexadecane droplet slides across the surface with very little resistance. The red dye present in the hexadecane droplet helps to confirm that the vacated area of the surface is not contaminated by the hexadecane. Further wear experiments carried out on honeycomb surfaces containing the lubricating liquid did not result in any change in the repellent properties of the surface, with droplets of hexadecane sliding over the wear location with no noticeable degradation in the repellency.

In certain applications, liquid-impregnated surfaces can exhibit greater long-term repellency than traditional liquid-repellent surfaces, the repellency of which is dependent on metastable states and trapped air. For instance, liquid-impregnated surface treatments could be better suited for applications where the contaminant liquid is in constant contact with the surface for extended periods of time or where the substrate is subject to vibration.

Summary

Liquid-repellent, slippery surfaces have been created on glass and polymer substrates via the formation of a honeycomb structure. Following UV activation and fluorosilane coupling to reduce the surface energy of the honeycombs, the substrate was dipped in a lubricating liquid, which became impregnated within the pores. This lubricating liquid layers repels other liquids placed on the surface through immiscible liquid-liquid contact. This results in very low tilt angles with droplets of both water and hexadecane sliding across the surface with no contamination. Such liquid-repellent surfaces will be more stable than repellent surfaces relying on the Cassie-Baxter state of wetting, where the liquid droplet being repelled is in a metastable state.

Example 2

Liquid-Impregnated Porous Polypropylene Surfaces for Liquid Repellency

Liquid repellency is a desirable surface property for a range of different applications including anti-fouling (Bhushan, 2016), self-cleaning, anti-smudge (Brown and Bhushan, 2015), and lab-on-chip (Gogolides et al., 2015) applications. By selecting the correct chemistry and topography, a coating can display a variety of liquid wetting properties. This is typically achieved through enhancing the surface properties by addition of roughness. Hydrophobic surfaces, when roughened, become more hydrophobic (Wenzel, 1936). Additionally, air can become trapped between the surface and the liquid creating a superhydrophobic surface (Cassie and Baxter, 1944). To create superhydrophobic surfaces, inspiration can be taken from the lotus leaf, which combines hydrophobic waxes and hierarchical roughness to result in a water-repellent surface (Barthlott and Neinhuis, 1997).

This is trivial for water but more difficult for lower surface tension liquids such as oils, since oil droplets are more likely to display contact angles of <90° on flat surfaces (oleophilic). High droplet contact angles via the Cassie-Baxter state of wetting can still be achieved, even if the contact angle on the flat surface ($\theta_{flat}$) is low, through the use of reentrant geometries, where surface asperities create an overhang (i.e. become narrower closer to the surface) (Nosonovsky and Bhushan, 2008; Brown and Bhushan, 2016a;b;c).

However, one drawback of utilizing surface roughness and trapped air as seen in the Cassie-Baxter regime is that the liquid exists in a metastable state and liquid resting on such a surface can eventually penetrate into the roughness, transitioning from a Cassie-Baxter regime to a wetted state, referred to as the Wenzel regime. In doing so, the surface becomes wet by the liquid and is no longer repellent.

Another method of creating liquid-repellent surfaces is to take inspiration from the Nepenthes pitcher plants (Bohn and Federle, 2004). Pitcher plants are well known for their carnivorous nature and feature pitcher-shaped traps that have evolved to capture and digest insects. Many pitcher plants capture prey by utilizing a waxy zone along the pitcher rim (peristome). This wax attaches to the adhesive pads of the insect, which can no longer adhere to the plant wall and fall into the trap (Gaume et al, 2004). However, pitcher plants of the genus Nepenthes have been found to capture prey by a different mechanism. In place of the waxy zone, the peristome of these pitcher plants features a regular microstructure that is wet by nectar and rainwater, resulting in a continuous liquid film over the surface of the rim. When wet, the peristome becomes extremely slippery and insects aquaplane across the surface and fall into the trap.

Artificial, liquid-impregnated surfaces inspired by the pitcher plant have previously been created. By adding to the surface a non-volatile liquid layer with a surface tension lower than that of the liquid being repelled, repellent surfaces can be created. The repellency of the surface is dependent upon the properties of the liquid layer and its miscibility with the liquids being repelled.

There are some requirements to ensure that the liquid-impregnated surfaces will be able to repel liquids. Firstly, they require surface topography features that ensure the lubricating liquid layer remains in place. This is achieved through the creation of a porous structure into which the impregnating liquid can wick. Second, the lubricating liquid must preferentially wet the solid surface. Untreated, the porous surface likely has a much higher surface energy than the fluorinated lubricating liquid (surface energy <20 mN m$^{-1}$). This means that, although the lubricating liquid coats the surface, there is little interaction between the two and a higher energy liquid that is added to the surface can displace the lubricating liquid. This can be mitigated by altering the chemistry of the porous structure through addition of a fluorosilane to match the chemistry of the lubricating liquid (Wong et al, 2011). This ensures that the solid-liquid interaction of the lubricating liquid will not be replaced by a more favorable solid-liquid interaction of the liquid being repelled. Finally, the lubricating liquid and the liquid to be repelled must be immiscible. If the two liquids are immiscible, the result is atomically flat liquid-liquid contact, which causes the repelled droplet to slide across the lubricating film with very little tilting of the surface.

Previous examples of liquid-impregnated surfaces have several drawbacks that potentially limit their applicability to a range of scenarios. For instance, an early example utilized random Teflon nanofibres or epoxy-molded nanoposts as the porous solid surface (Wong et al, 2011). These examples made for good model surfaces but their composition, fragility, and cost makes them unsuitable for certain real world applications.

Another issue with previous examples is the requirement for specific substrates. For instance, one example utilized colloidal templating to create highly ordered porous monolayers. However, this technique requires the nanostructured film be bonded to glass or other oxide substrates, limiting its applicability (Vogel et al, 2013). Other examples requiring specific substrates include nano-textured alumina (Ma et al, 2013) and electrodeposited polypyrrole nanostructures (Kim et al, 2012).

Finally, one method more suited to a range of applications and substrates involves spray coating wax to form the porous layer (Smith et al, 2013). The wax layer is sufficiently porous to be impregnated by the liquid layer, which is sprayed separately. The focus on spray coating means that this technique could be used in manufacturing processes, however, the durability of the porous wax coating remains unclear. Porous structures are likely to be more fragile than their planar equivalents and the long-term durability of the porous layer is crucial to ensure the lubricating liquid remains immobilized on the surface and is able to repel the liquid of interest.

In this example, mechanically durable liquid-repellent polypropylene has been achieved through the creation of a liquid-impregnated porous polymer surface. Polypropylene is a common polymer used in a wide variety of applications including consumer packaging, automotive parts, and textiles. Water and oil-repellent polypropylene surfaces are therefore of interest for a wide range of industrial and consumer applications such as in packaging, where it is desirable for the product to be repelled from and not foul the container, reducing wastage and improving the customer experience.

Here, porous polypropylene surfaces are created (which are hydrophobic) and further treated with UV irradiation and fluorosilane coupling to ensure the lubricating liquid will remain impregnated within the polymer structure and no preferential dewetting will occur when the liquid to be repelled is added to the surface. The chemically modified porous polypropylene surfaces were then dipped into the lubricating liquid. The repellency of these liquid-impregnated porous polypropylene surfaces was tested against water, hexadecane, shampoo, and laundry detergent. Shampoo and laundry detergent both contain surfactants, molecules that contain polar head groups and non-polar tail groups.

These molecules are very surface active and can adhere strongly to substrates thereby altering their surface chemistry. Repellency against surfactant-containing liquids is therefore more challenging than repelling low surface tension oils.

The durability of the surfaces has also been tested; durability is important if these surfaces are to be feasible for application in various industries including medical, transportation, construction, and consumer goods packaging. Since the porous polymer layer is comprised of the same material as the bulk, interfacial adhesion should be greatly improved compared to other techniques.

Experimental Details

Figure 6:
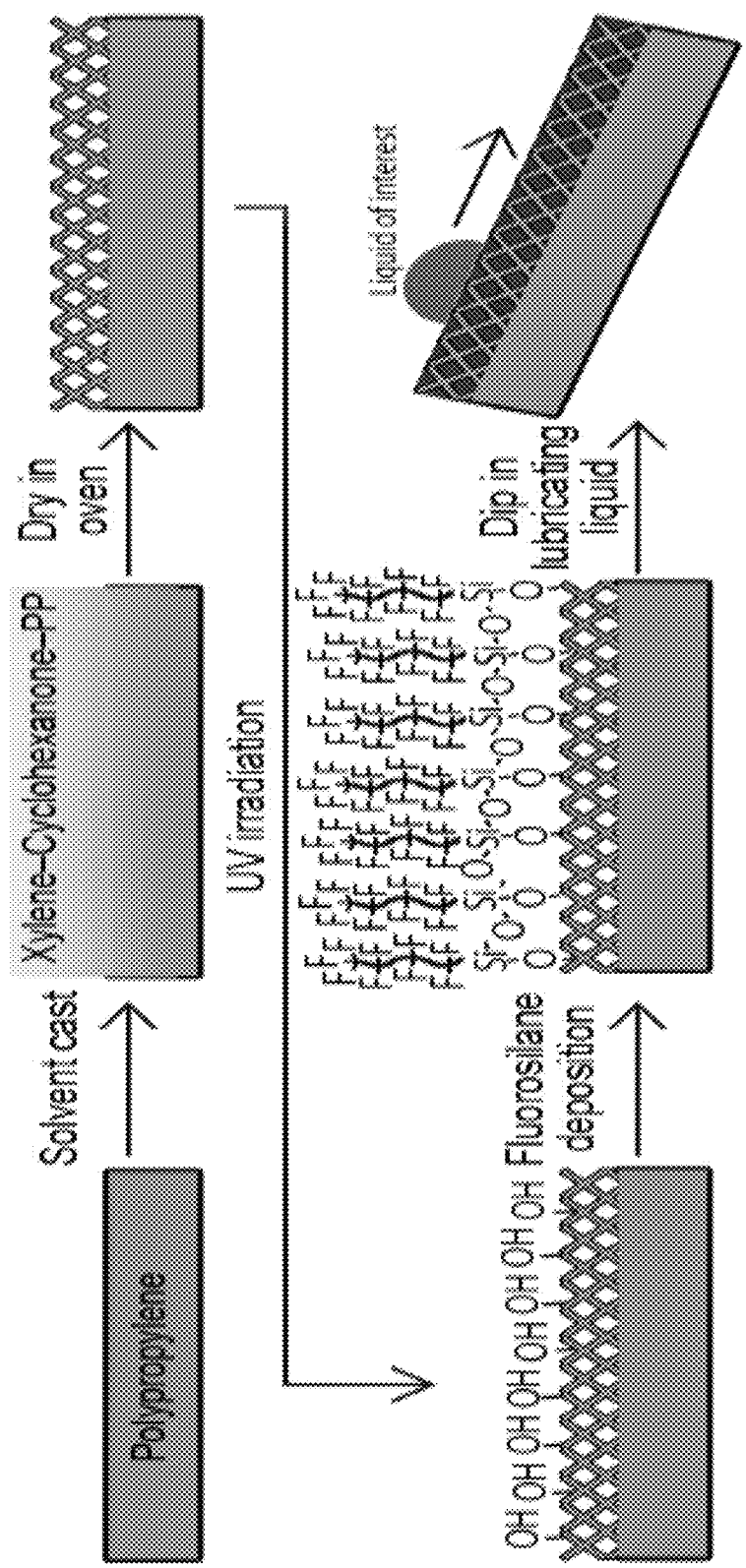
FIG. 6 is a schematic to show the creation of liquid-impregnated porous polypropylene surfaces using a solvent-non solvent technique.

In order to achieve the porous structures required for creating liquid-impregnated surfaces, the surfaces described in this paper comprise polypropylene treated with a xylene-cyclohexanone-polypropylene mixture heated to 135° C., FIG. 6. As previously reported, this solvent mixture results in porous polypropylene layer (Erbil et al, 2003). The porous surface is then activated using UV irradiation and treated with fluorosilane to better to ensure the impregnating liquid will preferably wet the surface. The surface is then dipped in the impregnating liquid to result in a liquid repellent surface.

Samples: Polypropylene sheet (PP, ASTM D4101-0112, SPI) cut to dimensions of 15 by 15 mm were used throughout. 0.2 g of polypropylene was dissolved in 10 mL xylene (Mallinckrodt) heated to 135° C. in a glass flask fitted with a water-cooled condenser to prevent solvent evaporation. Once the polymer was fully dissolved, 4 mL cyclohexanone (Sigma Aldrich) was added and the mixture was stirred for 1 h. Then, a droplet of the solution was added to the polypropylene surface and the surface was dried in an oven at 70° C. for 1 h. To activate the polymer surface for silane attachment, samples were UV irradiated for at least 12 h (15 W, $\lambda_{max}$=254 nm). Samples were fluorinated via chemical vapor deposition of a silane (to lower surface energy), which was required in order to ensure preferential wetting by the lubricating liquid. One drop of trichloro (1H,1H,2H,2H perfluorooctyl) silane (fluorosilane, Sigma Aldrich) was deposited next to the samples which were covered and left for 2 h. The sample was then dipped into the impregnating liquid, in this instance a perfluoropolyether (Krytox GPL 102, Dupont) with a chemical structure of F—(CF(CF$_3$)—CF$_2$—O)$_n$—CF$_2$CF$_3$ where n=10-60, a surface tension of 16-20 mN m$^{-1}$, and a viscosity of 38 cSt.

Contact angle and tilt angle: For contact angle data, 5-μL droplets of water (surface tension 72 mN m$^{-1}$) and nhexadecane (99%, Alfa Aesar, surface tension 27 mN m$^{-1}$ (Haynes, 2014)) were deposited onto samples using a standard automated goniometer (Model 290, Ramé-Hart Inc.) and the resulting image of the liquid-air interface analyzed with DROPimage software. Tilt angles were measured by inclining the surface until the 5-μL droplet slid off. All angles were averaged over at least five measurements on different areas of a sample.

SEM imaging: Scanning electron microscope (SEM, Philips/FEI Sirion) images were taken to determine the topography of the polypropylene samples. Samples were mounted with conductive tape and gold-coated prior to SEM imaging.

Wear experiments: The mechanical durability of the surfaces was examined through macrowear experiments performed with an established procedure of using a ball-on-flat tribometer (Bhushan, 2013). A sapphire ball of 3 mm diameter was fixed in a stationary holder. A load of 10 mN was applied normal to the surface, and the tribometer was put into reciprocating motion for 200 cycles. Stroke length was 6 mm with an average linear speed of 1 mm s$^{-1}$. Surfaces were imaged before and after the tribometer wear experiment using an optical microscope with a CCD camera (Nikon Optihot-2) to examine any changes.

Contact pressures for the tribometer wear experiments were calculated based on Hertz analysis (Bhushan, 2013). The elastic modulus of polypropylene, 1.3 GPa (Anonymous, 2014), was used as an estimate for the elastic modulus of the composite coating, and a Poisson's ratio of 0.42 was used (Anonymous, 2014). An elastic modulus of 390 GPa and Poisson's ratio of 0.23 were used for sapphire ball used in the macroscale wear experiments and the mean contact pressure was calculated as 8.6 MPa.

Shampoo and detergent repellency: To test the repellency of these surfaces towards consumer products, droplets of shampoo (Head and Shoulders, Procter and Gamble Co.) and laundry detergent (Tide, Procter and Gamble Co.) were placed onto the surface and the resulting surface-liquid interaction was photographed. The shampoo contains sodium lauryl sulfate and sodium laureth sulfate surfactants while the laundry detergent contains sodium alcoholethoxy sulfate and sodium alkylbenzene sulfonate surfactants. At high concentrations, these surfactants can typically have surface tensions on the order of 25 mN m$^{-1}$. In the products listed, depending upon concentration, the surface tensions will likely be in the range of 25-60 mN m$^{-1}$ (Ross and Epstein, 1958; Al-Sabagh et al, 2011).

TABLE 2

Comparison of static contact angles and tilt angles for water and hexadecane droplets deposited on polypropylene surfaces.

| Surface | Water | | Hexadecane | |
|---|---|---|---|---|
| | Contact angle (°) | Tilt angle (°) | Contact angle (°) | Tilt angle (°) |
| Flat PP | 96 ± 1 | N/A | 35 ± 2 | N/A |
| Porous PP | 122 ± 2 | N/A | 17 ± 2 | N/A |
| Porous PP + fluorosilane | 136 ± 2 | N/A | 97 ± 2 | N/A |
| Porous PP + fluorosilane + lubricating liquid | 115 ± 2 | 2 ± 1 | 70 ± 1 | 4 ± 2 |

Results and Discussion

Figure 7:
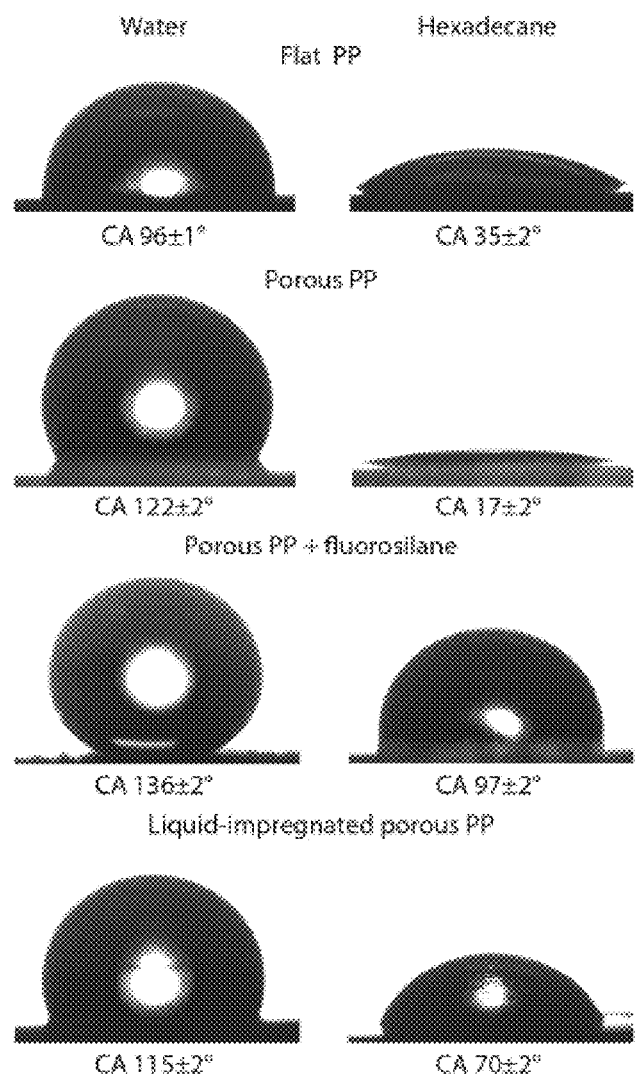
FIG. 7 shows contact angle images for droplets water and hexadecane on polypropylene surfaces.
Figure 8:
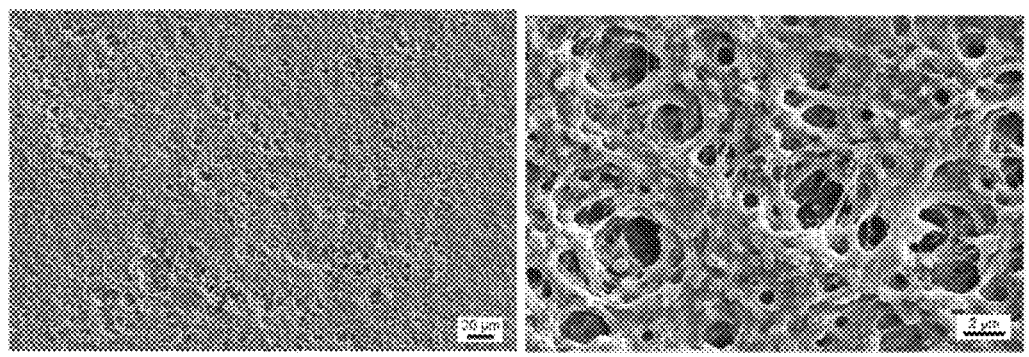
FIG. 8 shows SEM images of porous polypropylene after solvent casting from a solvent-non solvent polymer solution.

Untreated polypropylene (flat PP) is found to be slightly hydrophobic with water contact angles of 96±1°, Table 2 and FIG. 7. In order to create the porous polymer layer, polypropylene was dissolved in a good solvent, xylene, at 135° C. Cyclohexanone (nonsolvent) was then added and a drop of the solution was cast onto a polypropylene substrate and dried in an oven at 70° C. The presence of the nonsolvent leads to separation into two phases, one polymer-rich and the other polymer-poor (Erbil et al, 2003). This phase separation results in the crystallization of the polymer into the porous structure observed after solvent evaporation and drying, FIG. 8. Once dried, the porous polymer layer was found to have a water contact angle of 122±2° due to the increase in surface roughness.

Figure 9:
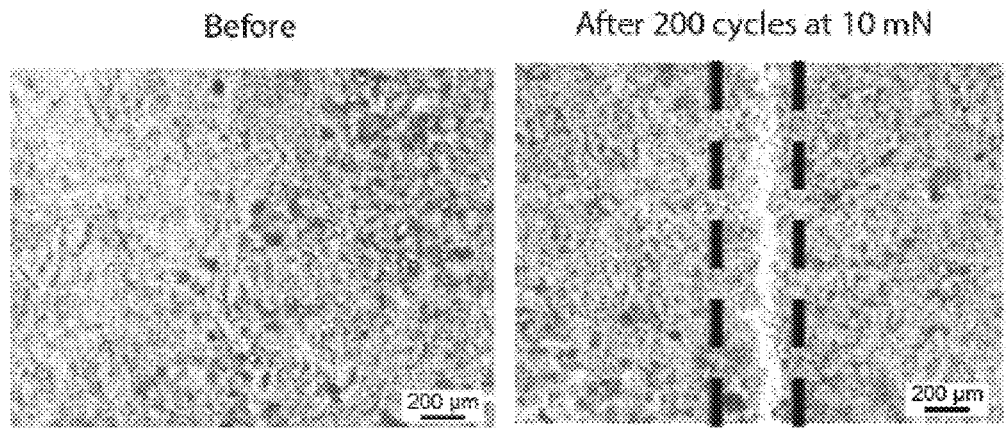
FIG. 9 shows optical micrographs before and after wear experiments using ball-on-flat tribometer using a 3-mm diameter sapphire ball at 10 mN loading on a porous polypropylene surface.

The mechanical durability of the porous polymer layer was investigated through the use of tribometer wear experiments and the resulting optical images, showing a portion of the wear track, are displayed in FIG. 9. The wear experiments were carried out with a load of 10 mN, with the tribometer put in reciprocating motion for 200 cycles. The images confirm that the surface features are not completely destroyed with minimal burnishing of the surface in the wear location. It is believed that these surfaces are significantly more durable than many other examples of liquid-impregnated surfaces, which typically rely on poorly adhered wax coatings (Smith et al, 2013) or delicate surface structures (Wong et al, 2011). Many studies typically fail to report any durability data. The durability of the porous layer is crucial since it ensures the lubricating liquid remains in place, impregnated within the pores. The porous structures required for this liquid repellency technique will be susceptible to higher contact stress than typical flat surfaces and so it is crucial that mechanical durability is reported.

In order to create the liquid-impregnated surfaces, the chemistry of the porous polymer layer must first be altered to ensure favorable wetting with the lubricating liquid and no preferential dewetting when another liquid is added to the surface. To achieve this, the porous polypropylene was first activated via UV irradiation to facilitate silane attachment.

Following fluorosilane treatment, the porous polypropylene surface displayed water contact angles of 136±2° and hexadecane contact angles of 97±2°, FIG. 7. This lowering of the surface energy is required to ensure that the lubricating liquid added in the next step will remain impregnated in the porous structure and will not be preferentially dewet by the liquid to be repelled.

In the final step to create the liquid-impregnated surfaces, the porous polypropylene is dipped into the lubricating liquid. The surface exhibits water contact angles of 115±2° and hexadecane contact angles of 70±2°, FIG. 7. However, due to the presence of the lubricating liquid, the surface displays very low tilt angles of 2±1° and 4±2° for water and hexadecane respectively, Table 2. Because the low tilt angles are a product of the homogeneity of the liquid-liquid interface, the surface tension of the liquid being repelled has little effect on the repellency of the surface. This is in contrast to lotus-inspired superoleophobic surfaces, where decreasing the surface tension of the oil being repelled results in an increase in the tilt angle (Brown and Bhushan, 2015).

If the porous polypropylene surface is not first chemically modified by fluorosilane prior to the liquid-impregnation step, the resulting surface is not repellent to certain liquids, such as hexadecane. This is because, in order for the liquid-impregnated surfaces to be liquid repellent, the lubricating film must have a strong affinity for the porous surface, and must not be displaced by the liquid being repelled (Wong et al, 2011). In the absence of the fluorosilane treatment, droplets of hexadecane are able to displace the lubricating liquid and wet into the porous structure, causing a loss of repellency. The fluorosilane ensures that impregnating liquid is stable and droplets of water and hexadecane remain on top of the lubricating film and can slide off with low tilt angles.

Figure 10:
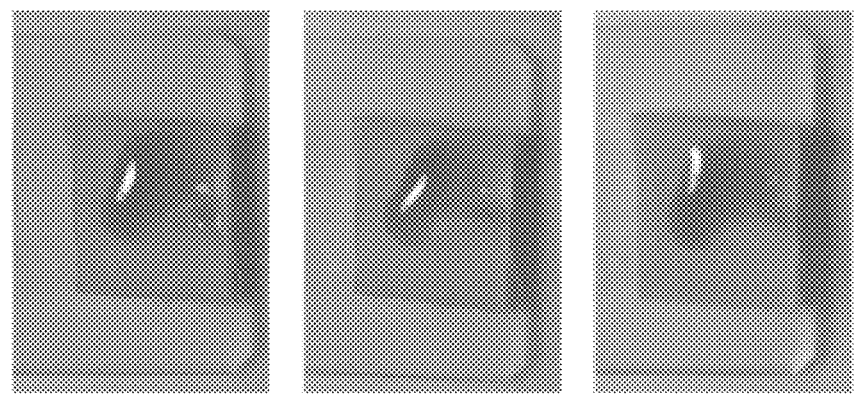
FIG. 10 shows photographs demonstrating hexadecane repellency of liquid-impregnated porous polypropylene compared to an untreated sample.
Figure 10:
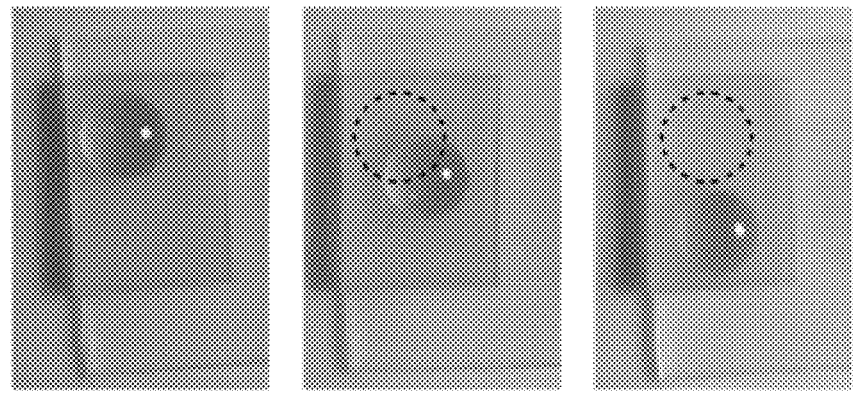

The low tilt angle means that liquid droplets placed on the surface are able to slide around the surface with very little tilting. In FIG. 10, droplets of hexadecane were added to untreated polypropylene and liquid-impregnated porous polypropylene surfaces. On the untreated surface, the hexadecane droplet spreads readily and then spreads further when the surface is tilted. In contrast, on the liquid-impregnated surface, the hexadecane droplet has less incentive to spread and so retains a more spherical shape. In addition, as the surface is tilted, the hexadecane droplet slides across the surface with very little resistance. The red dye present in the hexadecane droplet helps to confirm that the vacated area of the surface is not contaminated by the hexadecane. If it is tilted for a sufficiently long time, the droplet can be completely removed from the slippery surface.

Figure 11:
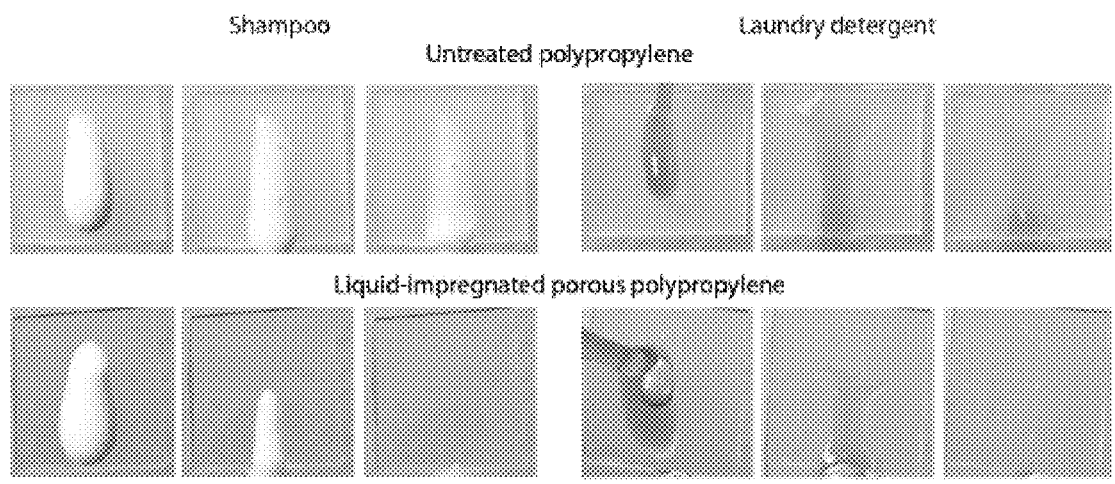
FIG. 11 shows photographs demonstrating repellency of shampoo and laundry detergent by liquid impregnated porous polypropylene compared to an untreated sample.

To determine the applicability of these liquid-impregnated surfaces in real world applications such as consumer packaging, their repellency against shampoo and laundry detergent was tested, FIG. 11. When droplets of the two liquids were added to samples of untreated plastic held vertically, gravity helped them spread over the surface with the liquids pinned at the location they were added. This is in comparison to the liquid-impregnated samples, upon which both liquids were able to slide over with no contamination. In the case of shampoo, the highly viscous liquid slid from the surface in the shape of a droplet with a pronounced trailing edge. For the laundry detergent, the liquid was found to spread more due to its lower viscosity. Though the main bulk of the liquid quickly vacated the surface, a thin film of detergent briefly remained before slowly dewetting the surface due to gravity and leaving the sample clean.

This repellency of surfactant-containing liquids is important for the consumer packaging industry. Surfactant-containing liquids readily coat the inside of plastic bottles, leading to wasted product and issues with recyclability. Liquid-impregnated surfaces will be more repellent towards surfactant-containing liquids because the surfactant is not in contact with the substrate and therefore cannot adhere and alter the surface energy. Furthermore, liquid-impregnated surfaces should display greater stability compared to traditional liquid repellent surfaces whose repellency relies on metastable states and trapped air. Liquid impregnated surface treatments as reported here would therefore be more suited for applications where the contaminant liquid is in contact with the surface for long periods of time or is subject to vibration, both of which can result in the collapse of the Cassie-Baxter regime in traditional liquid-repellent surfaces.

Summary

Liquid-repellent, slippery surfaces inspired by the Nepenthes pitcher plant have been created via the deposition of a porous polymer layer by utilizing a solvent-nonsolvent solution. It is believed that this method is more industrially viable and produces porous structures more durable than previous examples. Following UV activation and fluorosilane coupling to reduce the surface energy of the pores, the porous substrate was dipped in a lubricating liquid, which became impregnated within the porous structure. This lubricating liquid provides the liquid-repellency through immiscible liquid-liquid contact, resulting in very low tilt angles and therefore good repellency with droplets of both water and hexadecane sliding from the surface with ease. It is believed these liquid-repellent surfaces will be more stable than lotus-inspired superoleophobic surfaces, which rely on metastable states and trapped air. Finally, drops of shampoo and laundry detergent were also repelled, meaning this surface treatment could be utilized in the consumer packaging of surfactant containing liquids.

REFERENCES

Bhushan, B. Biomimetics: Bioinspired Hierarchical-Structured Surfaces for Green Science and Technology, 2nd ed. (Springer International, Switzerland, 2016).

Brown, P. S. & Bhushan, B. Mechanically durable, superoleophobic coatings prepared by layer-by-layer technique for anti-smudge and oil-water separation. Sci. Rep. 5, 8701 pp 1-9 (2015).

Wenzel, R. N. Resistance of Solid Surfaces to Wetting by Water. Ind. Eng. Chem. 28, 988-994 (1936).

Cassie, A. B. D. & Baxter, S. Wettability of porous surfaces. Trans. Faraday Soc. 40, 546-551 (1944).

Nosonovsky, M. & Bhushan, B. Multiscale Dissipative Mechanisms and Hierarchical Surfaces (Springer-Verlag, Heidelberg, Germany, 2008).

Tuteja, A., Choi, W., Mabry, J. M., McKinley, G. H. & Cohen, R. E. Robust omniphobic surfaces. Proc. Natl. Acad. Sci. 105, 18200-18205 (2008).

Brown, P. S. & Bhushan, B. Designing bioinspired superoleophobic surfaces. APL Mater. 4, 015703 (2016).

Brown, P. S. & Bhushan, B. Durable, superoleophobic polymer-nanoparticle composite surfaces with re-entrant geometry via solvent-induced phase transformation. Sci. Rep. 6, 21048 pp 1-11 (2016).

Brown, P. S. & Bhushan, B. Durable superoleophobic polypropylene surfaces. Phil. Trans R. Soc. A 374, 20160193 pp 1-9 (2016).

Bohn, H. F. & Federle, W. Insect aquaplaning: Nepenthes pitcher plants capture prey with the peristome, a fully wettable water-lubricated anisotropic surface. Proc. Natl. Acad. Sci. 101, 14138-14143 (2004).

Wong, T.-S. et al. Bioinspired self-repairing slippery surface with pressure-stable omniphobicity. Nature 477, 443-447 (2011).

Vogel, N., Belisle, R. A., Hatton, B., Wong, T.-S. & Aizenberg, J. Transparency and damage tolerance of patternable omniphobic lubricated surfaces based on inverse colloidal monolayers. Nature Commun. 4, 2176 pp 1-10 (2013).

Ma, W., Higaki, Y., Otsuka, H. & Takahara, A. Perfluoropolyether-infused nanotexture: a versatile approach to omniphobic coatings with low hysteresis and high transparency. Chem. Commun. 49, 597-599 (2013).

Kim, P. et al. Liquid-Infused Nanostructured Surfaces with Extreme Anti-Ice and Anti-Frost Performance. ACS Nano 6, 6569-6577 (2012).

Smith, J. D. et al. Self-lubricating surfaces for food packaging and food processing equipment. U.S. Pat. No. 8,535,779B1 (2013).

Brown, P. S. & Bhushan, B. Liquid-impregnated porous polypropylene surfaces for liquid repellency. J. Colloid Interf. Sci. 487, 437-443 (2017).

Rayleigh, L. Breath Figures. Nature 86, 416-417 (1911).

Widawski, G., Rawiso, M. & Francois, B. Self-organized honeycomb morphology of star-polymer polystyrene film. Nature 369, 387-389 (1994).

Stenzel, M. H., Barner-Kowollik, C. & Davis, T. P. Formation of honeycombstructured, porous films via breath figures with different polymer architectures. J. Polym. Sci. Part A: Polym. Chem. 44, 2363-2375 (2006).

Srinivasarao, M., Collings, D., Philips, A. & Patel, S. Three-Dimensionally Ordered Array of Air Bubbles in a Polymer Film. Science 292, 79-83 (2001).

Peng, J., Han, Y., Yang, Y. & Li, B. The influencing factors on the macroporous formation in polymer films by water droplet templating. Polymer 45, 447-452 (2004).

Ferrari, E., Fabbri, P. & Pilati, F. Solvent and Substrate Contributions to the Formation of Breath Figure Patterns in Polystyrene Films. Langmuir 27, 1874-1881 (2011).

Zhang, P., Chen, H., Zhang, L., Ran, T. & Zhang, D. Transparent self-cleaning lubricant-infused surfaces made with large-area breath figure patterns. Appl. Surf. Sci. 355, 1083-1090 (2015).

Haynes, W. M. Handbook of Chemistry and Physics, 95th ed. (CRC Press, Boca Raton, Fla., 2014).

Bhushan, B. Introduction to Tribology, 2nd ed. (Wiley, New York, 2013). 26. Polystyrene, http://www.goodfellow.com/E/Polystyrene.html, accessed Feb. 18, 2017.

Al-Sabagh, A. M., Abd-El-Bary, H. M., El-Ghazawy, R. A., Mishrif, M. R., and Hussein, B. M. (2011) "Surface active and thermodynamic properties of some surfactants derived from locally linear and heavy alkyl benzene in relation to corrosion inhibition efficiency," Mater. Corros. 62, 1015-1030.

Barthlott, W. and Neinhuis, C. (1997), "Purity of the Sacred Lotus, or Escape from Contamination in Biological Surfaces," Planta 202, 1-8.

Bhushan, B. (2013), Introduction to Tribology, 2nd ed., Wiley, New York.

Bhushan, B. (2016), Biomimetics: Bioinspired Hierarchical-Structured Surfaces for Green Science and Technology, 2nd ed., Springer International, Switzerland.

Bohn, H. F. and Federle, W. (2004) "Insect aquaplaning: Nepenthes pitcher plants capture prey with the peristome, a fully wettable water-lubricated anisotropic surface," Proc. Natl. Acad. Sci. 101, 14138-14143.

Brown, P. S. and Bhushan, B. (2015) "Mechanically durable, superoleophobic coatings prepared by layer-by-layer technique for anti-smudge and oil-water separation," Sci. Rep. 5, 8701 pp 1-9.

Brown, P. S. and Bhushan, B. (2016a) "Designing bioinspired superoleophobic surfaces," APL Mater. 4, 015703.

Brown, P. S. and Bhushan, B. (2016b) "Durable, superoleophobic polymer-nanoparticle composite surfaces with re-entrant geometry via solvent-induced phase transformation," Sci. Rep. 6, 21048 pp 1-11.

Brown, P. S. and Bhushan, B. (2016c) "Durable superoleophobic polypropylene surfaces," Phil. Trans R. Soc. A 374, 20160193 pp 1-9.

Cassie, A. B. D. and Baxter, S. (1944) "Wettability of porous surfaces," Trans. Faraday Soc. 40, 546-551.

Erbil, H. Y., Demirel, A. L., Avci, Y., and Mert, O. (2003) "Transformation of a Simple Plastic into a Superhydrophobic Surface," Science 299, 1377-1380.

Franco, J. A., Kentish, S. E., Perera, J. M., and Stevens G. W. (2008) "Fabrication of a superhydrophobic polypropylene membrane by deposition of a porous crystalline polypropylene coating," J. Membr. Sci. 318, 107-113.

Gaume, L., Perret, P., Gorb, E., Gorb, S., Labat, J.-J., and Rowe, N. (2004) "How do plant waxes cause flies to slide? Experimental tests of wax-based trapping mechanisms in three pitfall carnivorous plants," Arthropod Struct. Dev. 33, 103-111.

Gogolides, E., Ellinas, K. and Tserepi, A. (2015) "Hierarchical micro and nano structured, hydrophilic, superhydrophobic and superoleophobic surfaces incorporated in microfluidics, microarrays and lab on chip microsystems," Microelectron. Eng. 132, 135-155.

Haynes, W. M. (2014), Handbook of Chemistry and Physics, 95th ed. CRC Press, Boca Raton, Fla.

Kim, P., Wong, T.-K., Alvarenga, J., Kreder, M. J., Adorno-Martinez, W. E., and Aizenberg, J. (2012) "Liquid-Infused Nanostructured Surfaces with Extreme Anti-Ice and Anti-Frost Performance," ACS Nano 6, 6569-6577.

Ma, W., Higaki, Y., Otsuka, H., and Takahara, A. (2013) "Perfluoropolyether-infused nanotexture: a versatile approach to omniphobic coatings with low hysteresis and high transparency," Chem. Commun. 49, 597-599.

Nosonovsky, M. and Bhushan, B. (2008) Multiscale Dissipative Mechanisms and Hierarchical Surfaces Springer-Verlag, Heidelberg, Germany.

Ross, J. and Epstein, M. B. (1958) "Surface Tension and surface Transition of Dilute Aqueous Solutions of Lauryl Alcohol in Sodium Lauryl Sulfate," J. Phys. Chem. 62, 533-535.

Smith, J. D., Dhiman, R., Paxson, A. T., Love, C. J., Solomon, B. R., and Varanasi, K. K. (2013) "Self-lubricating surfaces for food packaging and food processing equipment," U.S. Pat. No. 8,535,779B1.

Vogel, N., Belisle, R. A., Hatton, B., Wong, T.-S., and Aizenberg, J. (2013) "Transparency and damage tolerance of patternable omniphobic lubricated surfaces based on inverse colloidal monolayers," Nature Commun. 4, 2176 pp 1-10.

Wenzel, R. N. (1936), "Resistance of Solid Surfaces to Wetting by Water," Ind. Eng. Chem. 28, 988-994.

Wong, T.-S., Kang, S. H., Tang, S. K. Y., Smythe, E. J., Hatton, B. D., Grinthal, A. and Aizenberg, J. (2011) "Bioinspired self-repairing slippery surface with pressure-stable omniphobicity," Nature 477, 443-447.

Throughout this application, various publications are referenced. The disclosures of these publications in their entireties are hereby incorporated by reference into this application in order to more fully describe the state of the art to which this invention pertains.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for producing a repellant surface, the method comprising:
    dissolving a polymer in a solvent to produce a polymer solution;
    adding a non-solvent to the polymer solution to produce a casting mixture, wherein the non-solvent is to the polymer;
    depositing the casting mixture on a surface of a substrate;
    evaporating the solvent and the non-solvent from the casting mixture to provide a coated-substrate having a roughened surface, wherein the roughened surface exhibits a water contact angle of at least about 100°; and
    introducing a lubricating liquid to the roughened surface to form a liquid impregnated layer, wherein the repellant surface exhibits a tilt angle of about 5° or less.

2. The method of claim 1, further comprising depositing a functional layer comprising a fluorinated silane on the roughened surface.

3. The method of claim 1, wherein the polymer includes a hydrophobic polymer comprising a polyalkylene, a vinyl aromatic polymer, an acrylonitrile butadiene styrene copolymer, copolymers thereof, or blends thereof.

4. The method of claim 1, wherein the solvent comprises an organic solvent.

5. The method of claim 1, wherein the polymer and the solvent are present in the casting mixture at a weight ratio of from 1:100 to 50:1.

6. The method of claim 1, wherein the non-solvent comprises a polar organic solvent.

7. The method of claim 1, wherein the solvent and the non-solvent are present in the casting mixture in a volume ratio of from 100:1 to 1:2.

8. The method of claim 1, wherein the roughened surface comprises a porous surface.

9. The method of claim 1, wherein the porous surface comprises a pore size of from 1 nm to 100 microns.

10. The method of claim 1, wherein the lubricating liquid comprises a fluorinated hydrocarbon.

11. The method of claim 1, wherein the repellant surface exhibits a water contact angle of at least about 105° and a hexadecane contact angle of at least about 65°.

12. A method for producing a repellant surface, the method comprising:
    dissolving a polymer in a solvent to produce a polymer solution, wherein the polymer is a hydrophobic polymer selected from the group consisting of a polyalkylene, a vinyl aromatic polymer, an acrylonitrile butadiene styrene copolymer, a polybutadiene polymer, and blends thereof;
    depositing the polymer solution on a surface of a substrate;
    evaporating the solvent from the polymer solution at ambient temperature and under an atmosphere comprising water vapor to provide a coated-substrate having a roughened surface, wherein the atmosphere has a relative humidity of at least about 30% and wherein the roughened surface exhibits a water contact angle of at least about 100°;
    depositing a functional layer comprising a fluorinated silane on the roughened surface; and
    introducing a lubricating liquid to the roughened surface to form a liquid impregnated layer, wherein the repellant surface exhibits a tilt angle of about 5° or less.

13. The method of claim 12, wherein the polymer includes a hydrophobic polymer comprising a polyalkylene, a vinyl aromatic polymer, an acrylonitrile butadiene styrene copolymer, a polybutadiene polymer, copolymers thereof, or blends thereof.

14. The method of claim 12, wherein the solvent comprises a water immiscible volatile solvent.

15. The method of claim 12, wherein the polymer and the solvent are present in the polymer solution at a weight ratio of from 1:100 to 50:1.

16. The method of claim 12, wherein the roughened surface comprises a honeycomb surface.

17. The method of claim 16, wherein the honeycomb surface comprises patterns having a size of from 100 nm to 100 microns.

18. The method of claim 12, wherein the lubricating liquid comprises a fluorinated hydrocarbon.

19. The method of claim 12, wherein the repellant surface exhibits a water contact angle of at least about 105° and a hexadecane contact angle of at least about 65°.

20. The method of claim 12, wherein the atmosphere has a relative humidity of at least about 50%.

21. The method of claim 12, wherein the hydrophobic polymer is selected form the group consisting of polypropylene, polyethylene, polyisobutylene, polymethylpentene, polybutylene, ethylene propylene rubber, ethylene propylene diene monomer rubber, polystyrene, polybutadiene, acrylonitrile butadiene styrene copolymer, and blends thereof.

* * * * *